United States Patent
Huang et al.

(10) Patent No.: US 12,519,570 B2
(45) Date of Patent: Jan. 6, 2026

(54) MULTI-LINK COMMUNICATION METHOD AND RELATED APPARATUS

(71) Applicant: HUAWEI TECHNOLOGIES CO., LTD., Shenzhen (CN)

(72) Inventors: Guogang Huang, Shenzhen (CN); Yuchen Guo, Shenzhen (CN); Ming Gan, Shenzhen (CN); Yunbo Li, Shenzhen (CN); Yiqing Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 408 days.

(21) Appl. No.: 17/971,843

(22) Filed: Oct. 24, 2022

(65) Prior Publication Data

US 2023/0040554 A1 Feb. 9, 2023

Related U.S. Application Data

(63) Continuation of application No. PCT/CN2021/080316, filed on Mar. 11, 2021.

(30) Foreign Application Priority Data

Apr. 29, 2020 (CN) .......................... 202010355213.1

(51) Int. Cl.
*H04L 1/1607* (2023.01)
*H04L 1/1829* (2023.01)

(52) U.S. Cl.
CPC .......... *H04L 1/1685* (2013.01); *H04L 1/1621* (2013.01); *H04L 1/1642* (2013.01); *H04L 1/1832* (2013.01)

(58) Field of Classification Search
CPC ... H04L 1/1621; H04L 1/1642; H04L 1/1832; H04L 1/1607; H04L 1/1614;
(Continued)

(56) References Cited

U.S. PATENT DOCUMENTS

2007/0230493 A1* 10/2007 Dravida .............. H04L 49/9073
370/412
2012/0014335 A1* 1/2012 Adachi ................. H04W 48/08
370/329
(Continued)

FOREIGN PATENT DOCUMENTS

CN 106716901 A 5/2017
CN 110199549 A 9/2019
(Continued)

OTHER PUBLICATIONS

"Li, Realize Method Of 802.11n Block Transmission Mechanism, May 15, 2013, CN 101754272" (Year: 2008).*

(Continued)

*Primary Examiner* — Paul H. Masur
(74) *Attorney, Agent, or Firm* — Maier & Maier, PLLC

(57) ABSTRACT

A multi-link aggregation transmission method and a related apparatus. The method includes: a receive end receives at least one of a data frame and a BAR frame over a plurality of links between the receive end and a transmit end, where the plurality of links includes a first link. The receive end receives a block acknowledgment request BAR frame over the first link, where the BAR frame carries SSN_1 corresponding to the first link. The receive end adjusts, based on SSNs corresponding to all the links, a value of a current starting sequence number WinStart of a scoreboard window. The receive end processes, based on the adjusted WinStart, a data frame received over the plurality of links. The receive end can adaptively adjust the WinStart.

12 Claims, 18 Drawing Sheets

(58) Field of Classification Search
CPC ... H04L 1/1628; H04L 1/1635; H04L 1/1671; H04L 1/1685; H04L 1/1829
USPC .......................................................... 370/329
See application file for complete search history.

(56) References Cited

U.S. PATENT DOCUMENTS

| | | |
|---|---|---|
| 2018/0205502 A1 | 7/2018 | Merlin et al. |
| 2019/0150214 A1 | 5/2019 | Zhou et al. |
| 2020/0021400 A1 | 1/2020 | Cherian et al. |
| 2020/0037288 A1 | 1/2020 | Huang et al. |
| 2021/0111836 A1* | 4/2021 | Huang .................. H04L 1/1642 |
| 2021/0112490 A1* | 4/2021 | Cariou .................. H04W 84/12 |
| 2021/0211234 A1* | 7/2021 | Kneckt ................. H04L 1/1614 |
| 2021/0211235 A1* | 7/2021 | Chu ...................... H04L 1/1614 |
| 2022/0086722 A1* | 3/2022 | Gan ...................... H04L 1/1845 |
| 2022/0416946 A1* | 12/2022 | Li ......................... H04L 1/1614 |
| 2023/0011167 A1* | 1/2023 | Chitrakar ............. H04L 5/0055 |
| 2023/0156840 A1* | 5/2023 | Chitrakar .............. H04W 76/15<br>370/329 |
| 2023/0179340 A1* | 6/2023 | Aio ....................... H04L 1/1685<br>370/329 |
| 2023/0262803 A1* | 8/2023 | Viger .................... H04L 47/34<br>370/329 |

FOREIGN PATENT DOCUMENTS

| | | | |
|---|---|---|---|
| WO | 2019191108 A1 | 10/2019 | |
| WO | WO-2020238812 A1 * | 12/2020 | ........... H04L 1/1614 |

OTHER PUBLICATIONS

Hu, Chunyu, "A BAR Variant For Multi-Link Operation", IEEE 802.11be Working Group, IEEE 802.11-19/1856r3, Apr. 27, 2020, pp. 1-6 (Year: 2020).*

Hu et al., "A BAR Variant For Multi-Link Operation", IEEE 802.11-20/122r0, Jan. 10, 2020, 6 pages.

Chu et al., "A-MPDU and BA", IEEE 802.11-19/1856r3, Nov. 6, 2019, 15 pages.

* cited by examiner

MULTI-LINK COMMUNICATION METHOD AND RELATED APPARATUS

CROSS-REFERENCE TO RELATED APPLICATIONS

This application is a continuation of International Application No. PCT/CN2021/080316, filed on Mar. 11, 2021, which claims priority to Chinese Patent Application No. 202010355213.1, filed on Apr. 29, 2020. The disclosures of the aforementioned applications are hereby incorporated by reference in their entireties.

TECHNICAL FIELD

The embodiments relate to the field of communication technologies, a multi-link communication method. and a related apparatus.

BACKGROUND

With development of wireless technologies, a multi-link device (MLD) can support multi-link communication, for example, perform communication on a 2.4 GHz frequency band, a 5 GHz frequency band, and a 60 GHz frequency band at a same time. Even if a multi-link device has a limited quantity of antennas, the multi-link device can still perform switching between different frequency bands to select an optimal frequency band to ensure communication quality. As more application traffic is carried over a wireless network, a wireless-fidelity (Wi-Fi) system evolves toward a goal of a high rate. To increase a peak rate of a station in the multi-link device, multi-link aggregation communication has become a feature of a next-generation wireless local area network (WLAN) technology.

Multi-link aggregation communication involves coordination between a plurality of links. Multiple Media Access Control protocol data units (MPDU) of a same traffic identifier (TID) of a data transmit end may be transmitted on the plurality of links, to increase a transmission rate of a TID data packet. A data receive end sorts, based on a sequence number (SN) carried in each MPDU frame header, the data packets with the same TID received on the plurality of links. According to a protocol, a MAC layer needs to deliver complete MSDUs (MAC service data units) to an upper layer in sequence.

In the conventional technology, a receiving status of an MPDU sent by the transmit end is acknowledged by using a scoreboard mechanism. However, in current multi-link aggregation, there are the following disadvantages when an existing scoreboard mechanism is used to acknowledge a receiving status of a transmitted MPDU:

If the transmit end sends a block acknowledgment request (BAR) over one link, where a starting sequence number (SSN) is set in the BAR, the receive end shifts a scoreboard starting sequence number (indicated as WinStart). When there are to-be-transmitted MPDUs that are on other links and that are with sequence numbers smaller than the SSN, the MPDUs sent by the transmit end that are with the sequence numbers smaller than the SSN are discarded by the receive end even if they are correctly received by the receive end.

SUMMARY

To resolve the foregoing problem, the embodiments may provide a multi-link aggregation transmission method, a device, a chip system, a computer-readable storage medium, and a computer program product.

According to a first aspect of the embodiments, a multi-link aggregation transmission method may be provided. The method may be applied to a receive end of multi-link aggregation transmission and may include the following steps.

The receive end receives at least one of a data frame and a BAR frame over a plurality of links between the receive end and a transmit end, where the plurality of links include a first link.

The receive end receives the block acknowledgment request BAR frame over the first link, where the BAR frame carries SSN_1 corresponding to the first link.

The receive end adjusts a value of a current starting sequence number WinStart of a scoreboard window based on SSNs corresponding to at least two links in the plurality of links, where the SSNs corresponding to the at least two links in the plurality of links include the SSN_1 corresponding to the first link and an SSN that corresponds to another link and that is stored in the receive end.

The receive end processes, based on the adjusted WinStart, the data frame received over the plurality of links.

According to a second aspect of the embodiments, a multi-link device may be provided. The multi-link device serves as a receive end of multi-link aggregation transmission, and includes:

a transceiver, configured to receive at least one of a data frame and a BAR frame over a plurality of links between the transceiver and a transmit end, where the plurality of links may include a first link, and the transceiver is configured to receive the block acknowledgment request BAR frame over the first link, where the BAR frame carries SSN_1 corresponding to the first link; and a processor, configured to adjust a value of a current starting sequence number WinStart of a scoreboard window based on SSNs corresponding to at least two links in the plurality of links, where the SSNs corresponding to the at least two links in the plurality of links include the SSN_1 corresponding to the first link and an SSN that corresponds to another link and that is stored in the receive end, where the processor is further configured to process, based on the adjusted WinStart, the data frame received over the plurality of links.

According to a third aspect of the embodiments, a multi-link aggregation transmission method may be provided. The method may be applied to a receive end of multi-link aggregation transmission and may include the following steps.

The receive end receives a data frame over a plurality of links between a transmit end and the receive end, where the plurality of links includes a first link.

The receive end receives a block acknowledgment request BAR frame over the first link.

The receive end parses a starting sequence number SSN_1 that is carried in the BAR frame and that corresponds to the first link, where the SSN_1 is a sequence number of a next data frame to be sent over the first link, or the SSN_1 is greater than a sequence number of a data frame discarded by the transmit end over the first link.

The receive end processes a data frame received over the plurality of links.

A fourth aspect of the embodiments may provide a multi-link device, where the multi-link device serves as a receive end of multi-link aggregation transmission, and includes:

a transceiver, configured to receive a data frame over a plurality of links between a transmit end and the transceiver, where the plurality of links includes a first link, where the transceiver is further configured to receive a block acknowledgment request BAR frame over the first link; and a processor, configured to parse a starting sequence number SSN_1 that is carried in the BAR frame and that corresponds to the first link, where the SSN_1 is a sequence number of a next data frame to be sent over the first link, or the SSN_1 is greater than a sequence number of a data frame discarded by the transmit end over the first link, where the processor is further configured to process the data frame received over the plurality of links.

A fifth aspect of the embodiments may provide a chip system, including at least one processor and an interface.

The interface is configured to input a data frame from a plurality of links between the interface and a transmit end, where the plurality of links may include a first link.

The interface is further configured to input the block acknowledgment request BAR frame received over the first link, where the BAR frame carries SSN_1 corresponding to the first link.

The processor is configured to adjust a value of a current starting sequence number WinStart of a scoreboard window based on SSNs corresponding to at least two links in the plurality of links, where the SSNs corresponding to the at least two links in the plurality of links include the SSN_1 corresponding to the first link and an SSN that corresponds to another link and that is stored in the receive end.

The processor is further configured to process, based on the adjusted WinStart, the data frame received over the plurality of links.

A sixth aspect of the embodiments may provide a chip system, including at least one processor and an interface.

The interface is configured to input a data frame received over a plurality of links between the interface and a transmit end, where the plurality of links may include a first link.

The interface is further configured to input a block acknowledgment request BAR frame received over the first link.

The processor is configured to parse a starting sequence number SSN_1 that is carried in the BAR frame and that corresponds to the first link, where the SSN_1 is a sequence number of a next data frame to be sent over the first link, or the SSN_1 is greater than a sequence number of a data frame discarded by the transmit end over the first link.

The processor is further configured to process the data frame received over the plurality of links.

In a first implementation of any one of the first to sixth aspects of the embodiments, that a value of a current starting sequence number WinStart of the scoreboard window is adjusted based on the SSN_1 corresponding to the first link and the SSN that corresponds to another link and that is stored in the receive end includes:

adjusting the WinStart to a smallest SSN value, where the smallest SSN value is a smallest SSN in the SSN_1 corresponding to the first link and the SSN that corresponds to another link and that is stored in the receive end.

That the data frame received over the plurality of links is processed based on the adjusted WinStart includes:

receiving a data frame sent over one specific link, where a sequence number SN of the data frame satisfies WinEnd<SN<WinStart+2^11; adjusting WinStart to WinStart=SN−WinSize+1; and updating an SSN that is in SSNs corresponding to the plurality of links and that is smaller than the adjusted WinStart to be the same as the adjusted WinStart. In other words, an SSN corresponding to any link that is smaller than the adjusted WinStart is updated to the adjusted WinStart.

In a second implementation of any one of the first to sixth aspects of the embodiments, that a value of a current starting sequence number WinStart of a scoreboard window is adjusted based on an SSN corresponding to each link includes:

adjusting the WinStart to a largest WinStart value, where the largest WinStart value is largest WinStart in WinStart before the BAR is received and WinStart after the BAR is received, the WinStart after the BAR is received is a smallest SSN value, and the smallest SSN value is a smallest SSN in the SSN_1 corresponding to the first link and the SSN that corresponds to another link and that is stored locally.

That the data frame received over the plurality of links is processed based on the adjusted WinStart includes:

receiving a data frame sent over one specific link, where a sequence number SN of the data frame satisfies WinEnd<SN<WinStart+2^11; and adjusting WinStart to WinStart=SN−WinSize+1.

In the first or the second implementation of any one of the first to the sixth aspects of the embodiments, the SSN_1 is a sequence number of a next data frame to be sent over the first link, or the SSN_1 is greater than a sequence number of a data frame discarded by the transmit end over the first link.

According to a seventh aspect of the embodiments, a multi-link aggregation transmission method may be provided. The method may be applied to a transmit end of multi-link aggregation transmission and may include the following steps.

The transmit end sends a data frame over a plurality of links between the transmit end and a receive end, where the plurality of links include a first link.

The transmit end sends a block acknowledgment request BAR frame over the first link, where the BAR frame carries a starting sequence number SSN_1 corresponding to the first link, and the SSN_1 is a sequence number of a next data frame to be sent over the first link, or the SSN_1 is greater than a sequence number of a data frame discarded by the transmit end over the first link.

An eighth aspect of the embodiments may provide a multi-link device, where the multi-link device serves as a transmit end of multi-link aggregation transmission, and includes:

a transceiver, configured to send a data frame over a plurality of links between the transceiver and a receive end, where the plurality of links may include a first link, and the transceiver is further configured to send a block acknowledgment request BAR frame over the first link; and a processor, configured to parse a starting sequence number SSN_1 that is carried in the BAR frame and that corresponds to the first link, where the SSN_1 is a sequence number of a next data frame to be sent over the first link, or the SSN_1 is greater than a sequence number of a data frame discarded by the transmit end over the first link.

An eighth aspect may provide a chip system, including at least one processor and an interface.

The interface is configured to output a data frame sent over a plurality of links between the interface and a receive end, where the plurality of links may include a first link.

The interface is further configured to output a block acknowledgment request BAR frame sent over the first link.

The processor is configured to carry, in the BAR frame, a starting sequence number SSN_1 corresponding to the first link, where the SSN_1 is a sequence number of a next data frame to be sent over the first link, or the SSN_1 is greater than a sequence number of a data frame discarded over the first link.

According to a ninth aspect of the embodiments, a first multi-link communication apparatus may be provided. The first multi-link communication apparatus may be configured to implement the method and the functions performed by the receive end in the first aspect or the third aspect and may be implemented by hardware/software. The hardware/software may include modules corresponding to the foregoing functions.

According to a tenth aspect of the embodiments, a second multi-link communication apparatus may be provided. The second multi-link device may be configured to implement the method and the functions performed by the transmit end in the seventh aspect and may be implemented by hardware/software. The hardware/software may include modules corresponding to the foregoing functions.

According to an eleventh aspect of the embodiments, a computer program product including instructions may be provided. When the computer program product runs on a computer, the computer is enabled to perform the method according to any one of the first aspect, the third aspect, or the seventh aspect.

According to a twelfth aspect of the embodiments, a non-transitory computer-readable storage medium may be provided. The non-transitory computer-readable storage medium is configured to store instructions. When the instructions are executed, the method according to any one of the first aspect, the third aspect, or the seventh aspect is implemented.

A thirteenth aspect of the embodiments may provide a chip including a processor. The processor is configured to invoke, from a memory, and run instructions stored in the memory, so that a communication device on which the chip is installed performs the method according to the first aspect, the third aspect, or the seventh aspect.

According to a fourteenth aspect of the embodiments, another chip may be provided. The chip may be a chip in a first multi-link device or a second multi-link device. The chip includes an input interface, an output interface, and a processing circuit. The input interface, the output interface, and the circuit are connected through an internal connection path. The processing circuit is configured to perform the method in the first aspect, the third aspect, or the seventh aspect.

According to a fifteenth aspect of the embodiments, another chip may be provided. The chip includes an input interface, an output interface, and a processor, and optionally, further includes a memory. The input interface, the output interface, the processor, and the memory are connected through an internal connection path. The processor is configured to execute code in the memory. When the code is executed, the processor is configured to perform the method according to the first aspect, the third aspect, or the seventh aspect.

According to a sixteenth aspect of the embodiments, an apparatus may be provided. The apparatus is configured to implement the method according to any one of the foregoing aspects.

BRIEF DESCRIPTION OF THE DRAWINGS

To describe the embodiments more clearly, the following briefly describes the accompanying drawings.

DETAILED DESCRIPTION OF THE EMBODIMENTS

The following describes the embodiments with reference to the accompanying drawings.

Figure 1:
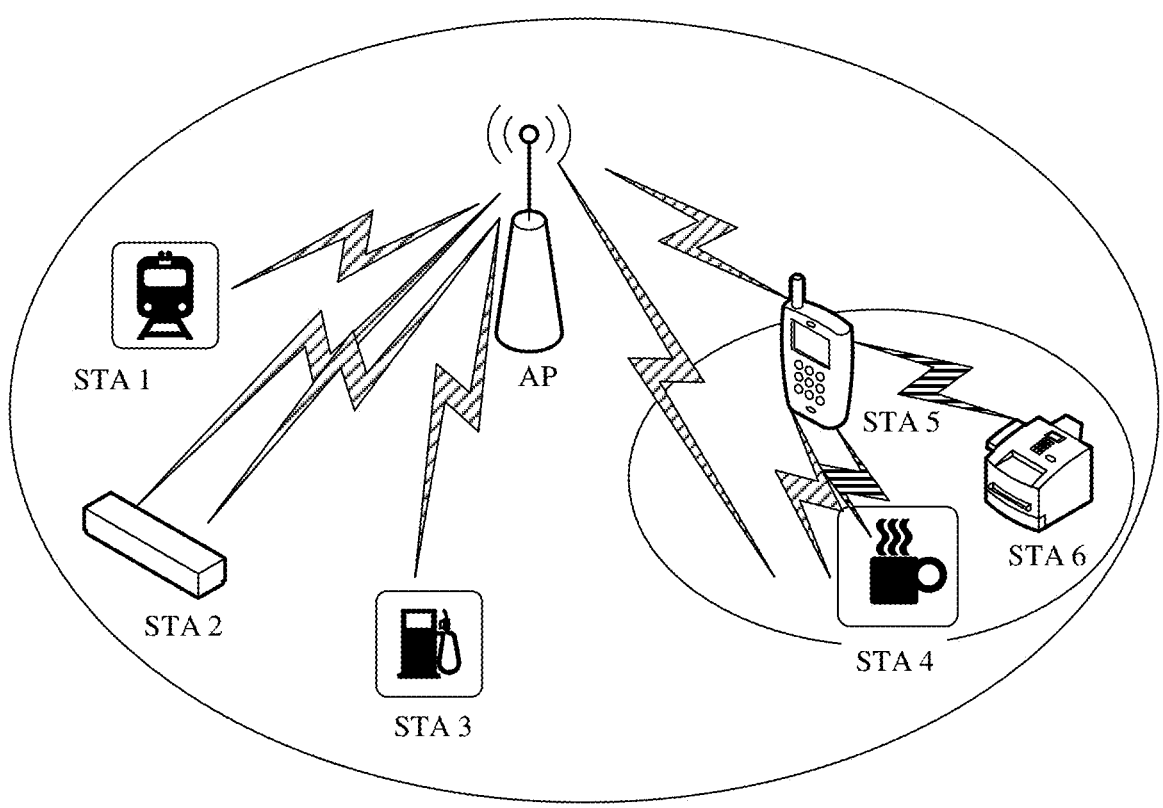
FIG. 1 is a schematic diagram of an architecture of a communication system according to an embodiment.

FIG. 1 is a schematic diagram of an architecture of a communication system according to an embodiment. The communication system includes an access point device and a station device. The communication system may include one or more access points (AP). FIG. 1 shows only one access point. The communication system further includes one or more stations (STA), for example, a STA 1 to a STA 6 shown in FIG. 1. There may be a plurality of links between the STA 2 and the AP. The STA 2 is a multi-link device. There may also be a plurality of links between the STA 4 and the STA 5. The STA 4 and the STA 5 are also multi-link devices. A multi-link device in the embodiments may be a station device or may be an access point device.

The architecture shown in FIG. 1 may also be extensively used in an application scenario in which a base station (BS) and a terminal device (UE) are included. The AP may be an access point used for a mobile user to access a wired network. The AP is deployed inside a house, a building, and a campus, with a typical coverage radius of tens of meters to hundreds of meters. Additionally, the AP may alternatively be deployed outdoors.

The AP is equivalent to a bridge that connects the wired network and a wireless network. The AP is used to connect wireless network clients to each other, and then connect the wireless network to the Ethernet. The AP may be a terminal device or network device with a Wi-Fi chip. The AP may be a device that supports 802.11be and a future 802.11 standard. Alternatively, the AP may be a device that supports multiple wireless local area network (WLAN) standards such as 802.11ax, 802.11ac, 802.11n, 802.11g, 802.11b, and 802.11a. The STA may be a wireless communication chip, a wireless sensor, or a wireless communication terminal, for example, a mobile phone that supports a Wi-Fi communication function, a tablet computer that supports a Wi-Fi communication function, a set-top box that supports a Wi-Fi communication function, a smart television that supports a Wi-Fi communication function, a smart wearable device that supports a Wi-Fi communication function, a vehicle-mounted communication device that supports a Wi-Fi communication function, or a computer that supports a Wi-Fi communication function. Optionally, the STA may support a device compliant with 802.11be and a future 802.11 standard. The STA may also support a plurality of WLAN standards such as 802.11ax, 802.11ac, 802.11n, 802.11g, 802.11b, and 802.11a.

Although the embodiments are described by using a network deployed based on IEEE 802.11 as an example, a person skilled in the art easily understands that various aspects may be extended to other networks using various standards or protocols such as Bluetooth, a high performance radio LAN (HIPERLAN), a wireless standard similar to the IEEE 802.11 standard and used in Europe, a wide area network (WAN), a wireless local area network (WLAN), a personal area network (PAN), or other networks currently known or later developed. Therefore, the various aspects are applicable to any suitable wireless network regardless of coverage and a wireless access protocol.

Figure 2:
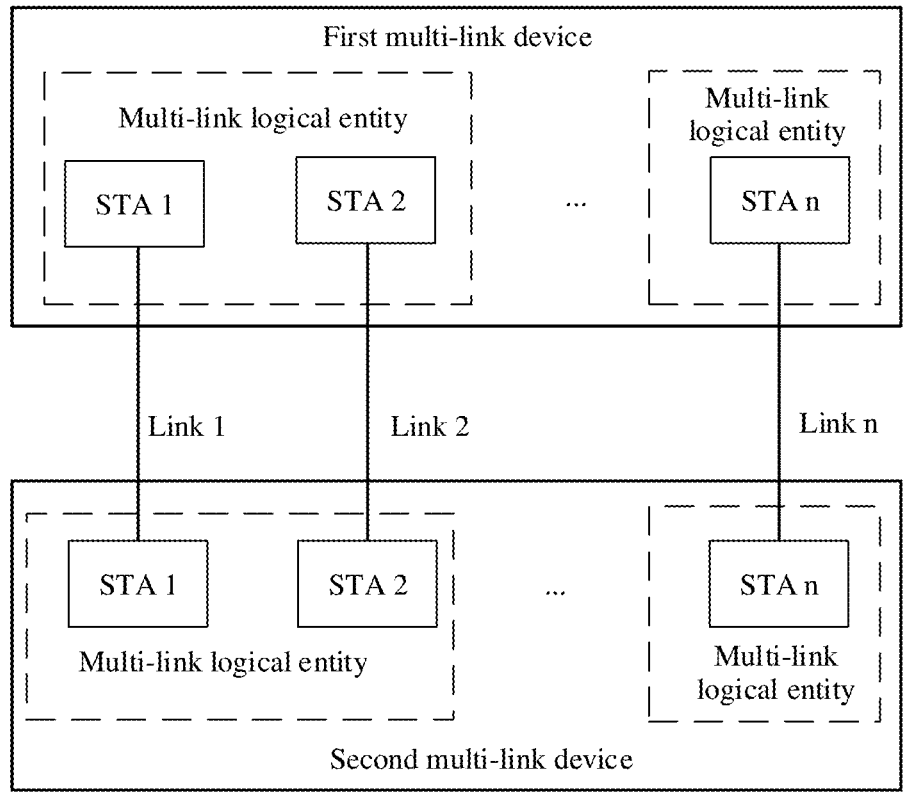
FIG. 2 is a schematic diagram of transmission between multi-link devices according to an embodiment.

FIG. 2 is a schematic diagram of association relationships between multi-link devices according to an embodiment. The multi-link device shown in FIG. 2 includes a first multi-link device and a second multi-link device. The first multi-link device or the second multi-link device may each include at least one multi-link logical entity. One multi-link logical entity may include one or more stations, and each station operates on a different link. A STA 1 and a STA 2 in the first multi-link device belong to one multi-link logical entity, and a STA n in the first multi-link device belongs to another multi-link logical entity. A STA 1 and a STA 2 in the second multi-link device belong to one multi-link logical entity, and a STA n in the second multi-link device belongs to another multi-link logical entity. If the first multi-link device needs to communicate with the second multi-link device, each station in the first multi-link device needs to be associated with a corresponding station in the second multi-link device.

As shown in FIG. 2, a STA 1 in the first multi-link device is associated with a STA 1 in the second multi-link device and operates on an aggregation link 1 (link 1 for short). A STA 2 in the first multi-link device is associated with a STA 2 in the second multi-link device and operates on an aggregation link 2 (link 2 for short). A STA n in the first multi-link device is associated with a STA n in the second multi-link device and operates on an aggregation link n (link n). In this way, each station in the first multi-link device may set up a connection to a corresponding station in the second multi-link device on a respective link, to implement multi-link communication between the two multi-link devices.

The multi-link device in the embodiments may include a hardware structure and a software module and may implement the foregoing functions in a form of the hardware structure, the software module, or a combination of the hardware structure and the software module. A function in the foregoing functions may be performed in a form of a hardware structure, a software module, or a combination of the hardware structure and the software module.

Figure 3A:
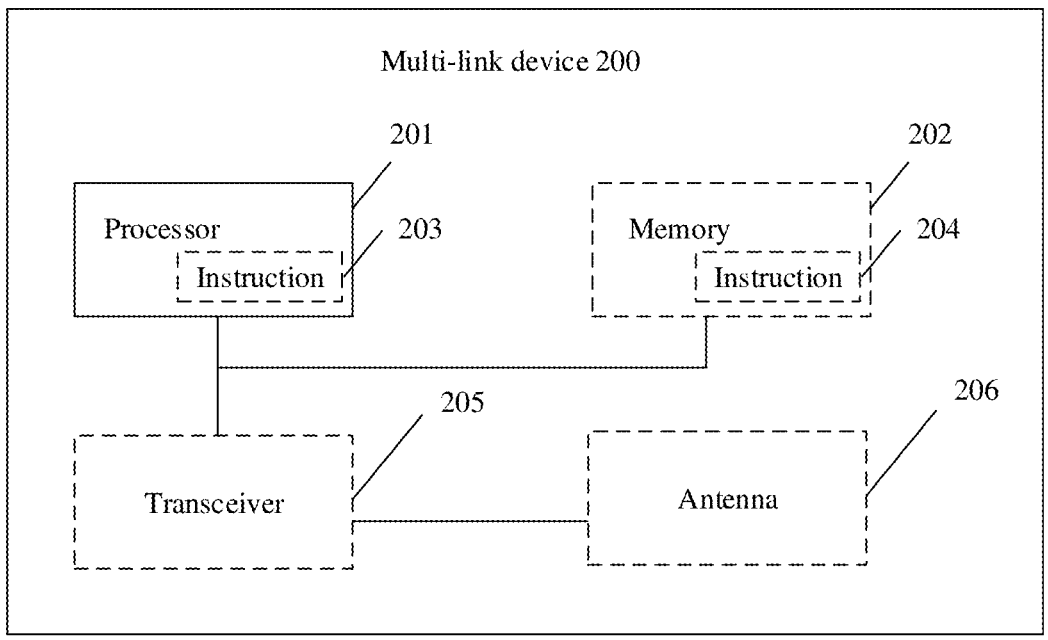
FIG. 3A is a schematic diagram of a structure of a multi-link device according to an embodiment.

FIG. 3A is a schematic diagram of a structure of a multi-link device 200 according to an embodiment. As shown in FIG. 3A, the multi-link device 200 may include a processor 201 and a transceiver 205, and optionally further include a memory 202.

The transceiver 205 may be referred to as a transceiver unit, a transceiver machine, a transceiver circuit, or the like, and is configured to implement a transceiver function. The transceiver 205 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function.

The memory 202 may store a computer program, software code, or instructions 204, where the computer program, the software code, or the instructions 204 may further be referred to as firmware. The processor 201 may control a MAC layer and a PHY layer by running a computer program, software code, or instructions 203 in the processor 201, or by invoking the computer program, the software code, or the instructions 204 stored in the memory 202, to implement the following embodiments. The processor 201 may be a central processing unit (CPU), and the memory 202 may be, for example, a read-only memory (ROM), or a random access memory (RAM).

The processor 201 and the transceiver 205 may be implemented in an integrated circuit (IC), an analog IC, a radio frequency integrated circuit RFIC, a mixed-signal IC, an application-specific integrated circuit (ASIC), a printed circuit board (PCB), an electronic device, or the like.

The multi-link device 200 may further include an antenna 206. Modules included in the multi-link device 200 are merely examples for description. This is not limited.

Figure 3B:
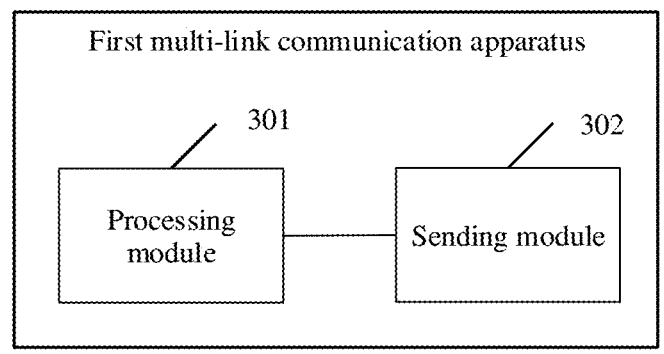
FIG. 3B is a schematic diagram of a structure of a multi-link communication apparatus according to an embodiment.

FIG. 3B is a schematic diagram of a structure of a first multi-link communication apparatus according to an embodiment. The first multi-link communication apparatus may be configured to implement any method and function related to the first multi-link device in the embodiments. The first multi-link communication apparatus may include a processing module 301 and a sending module 302. Optionally, the sending module 302 corresponds to one baseband circuit and one radio frequency circuit that are included in the first multi-link device. The first multi-link communication apparatus is used as a transmit end of multi-link aggregation transmission. Detailed descriptions of the modules are as follows.

In an embodiment:

A sending module 302 may be configured to send a data frame over a plurality of links to a second multi-link device, where the plurality of links may include a first link.

The sending module 302 is further configured to send a block acknowledgment request BAR frame over the first link.

The processing module 301 is configured to parse a starting sequence number SSN_1 that is carried in the BAR frame and that corresponds to the first link, where the SSN_1 is a sequence number of a next data frame to be sent over the first link, or the SSN_1 is greater than a sequence number of a data frame discarded by the first multi-link device over the first link.

For content and functions of elements or fields included in the data frame and the BAR frame, refer to descriptions in subsequent method embodiments. Details are not described herein again.

Figure 3C:
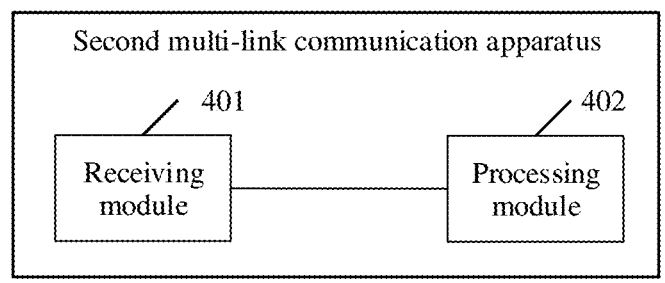
FIG. 3C is a schematic diagram of a structure of a multi-link communication apparatus according to an embodiment.

FIG. 3C is a schematic diagram depicting a structure of a second multi-link communication apparatus according to an embodiment. The second multi-link communication apparatus may be configured to implement any method and function related to the second multi-link device in any one of the embodiments. The second multi-link communication apparatus may include a receiving module 401 and a processing module 402. The second multi-link communication apparatus is used as a receive end of multi-link aggregation transmission, and detailed descriptions of the modules are as follows.

In an implementation:

The receiving module 401 is configured to receive a data frame over a plurality of links between a transmit end and the receiving module, where the plurality of links includes a first link.

The receiving module 401 is further configured to receive a block acknowledgment request BAR frame over the first link.

The processing module 402 is configured to parse a starting sequence number SSN_1 that is carried in the BAR frame and that corresponds to the first link, where the SSN_1 is a sequence number of a next data frame to be sent over the first link, or the SSN_1 is greater than a sequence number of a data frame discarded by the transmit end over the first link.

The processing module 402 is further configured to process the data frame received over the plurality of links.

In another implementation:

The receiving module 401 is configured to receive at least one of a data frame and a BAR frame over a plurality of links between the receiving module and a transmit end, where the plurality of links includes a first link.

The receiving module 401 is configured to receive a block acknowledgment request BAR frame over the first link, where the BAR frame carries SSN_1 corresponding to the first link.

The processing module 402 is configured to adjust a value of a current starting sequence number WinStart of a scoreboard window based on SSNs corresponding to at least two links in the plurality of links, where the SSNs corresponding to the at least two links in the plurality of links include the SSN_1 corresponding to the first link and an SSN that corresponds to another link and that is stored in the receive end.

It should be understood that an SSN corresponding to each link is an SSN of each link, and values of SSNs of links may be the same or may be different. The multi-link communication apparatus may set the SSNs of the links uniformly or separately. This is not limited.

Optionally, the second multi-link communication apparatus further includes a memory or a buffer, configured to store respective SSNs of the plurality of links.

The processor 402 is further configured to process, based on the adjusted WinStart, the data frame received over the plurality of links.

For content and functions of elements or fields included in the data frame and the BAR frame in the foregoing two manners, refer to descriptions in subsequent method embodiments. Details are not described herein again.

It should be noted that implementations of the modules may further correspond to corresponding descriptions in method embodiments, and perform the methods and functions performed by the second multi-link device in the foregoing embodiments.

An embodiment may further provide a processor, configured to be coupled to a memory, and configured to perform any method and function related to the first multi-link device or the second multi-link device in any one of embodiments.

An embodiment may further provide a computer program product including instructions. When the computer program product is run on a computer, the computer is enabled to perform any method and function related to the first multi-link device or the second multi-link device in any one of embodiments.

An embodiment may further provide an apparatus, configured to perform any method and function related to the first multi-link device or the second multi-link device in any one of embodiments.

An embodiment may further provide a wireless communication system. The system includes at least one first multi-link device and at least one second multi-link device according to any embodiment.

As described above, the multi-link device described in the foregoing embodiments may be an access point or a station. However, a scope of the multi-link device is not limited thereto, and a structure of the multi-link device may not be limited in FIG. 3A to FIG. 3C. The multi-link device may be an independent device or may be a part of a larger device. For example, an implementation form of the multi-link device may be:

(1) an independent integrated circuit (IC), a chip, a chip system, or a subsystem; (2) a set including one or more ICs, where optionally, the set of ICs may also include a storage component for storing data and instructions; (3) a module that can be embedded in other devices; (4) a receiver, an intelligent terminal, a wireless device, a handheld device, a mobile unit, a vehicle-mounted device, a cloud device, an artificial intelligence device, or the like; or (5) others.

Figure 4:
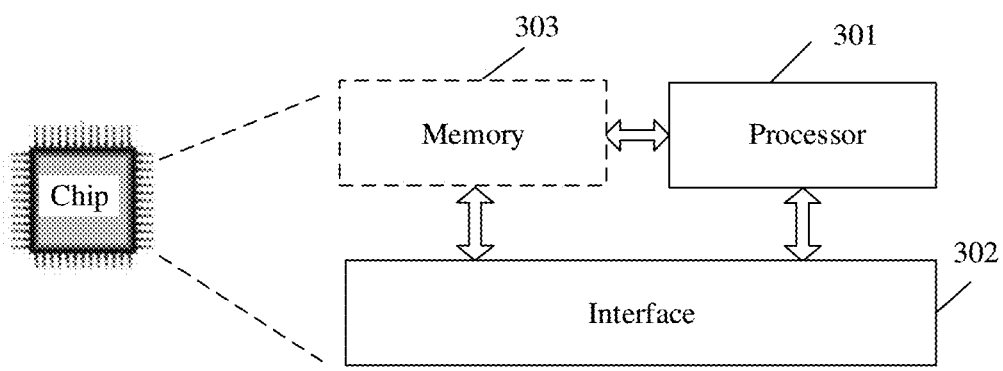
FIG. 4 is a schematic diagram of a structure of a chip system according to an embodiment.

For a case in which an implementation form of the multi-link device is a chip or a chip system, refer to the schematic diagram of a structure of a chip shown in FIG. 4. The chip shown in FIG. 4 includes a processor 301 and an interface 302. There may be one or more processors 301, and there may be a plurality of interfaces 302. Optionally, the chip or the chip system may include a memory 303.

The embodiments are not limiting. A person skilled in the art may adaptively change functions and deployments the of elements, or omit, replace, or add various processes or components as appropriate without departing from the scope of embodiments.

For ease of understanding, the following first briefly describes related solutions or terms in the embodiments.

1. Acknowledgment Mechanism

Whether an MPDU is correctly received is usually acknowledged by using an acknowledgment mechanism. Generally, there are three acknowledgment manners:

ACK-based acknowledgment manner: The transmit end sends an MPDU and sets an acknowledgment policy subfield in a quality of service (QoS) field to normal receiving.

If the receive end correctly receives the MPDU, the receive end returns an ACK message to the transmit end to indicate that the receive end correctly receives the MPDU.

Normal acknowledgment-based block acknowledgment manner: The transmit end sends an aggregation MPDU (A-MPDU) and sets an acknowledgment policy subfield in a QoS field to normal block acknowledgment. The receive end separately parses each MPDU in the aggregation MPDU and returns a block acknowledgment (BA) frame based on whether each MPDU is successfully received. The BA frame carries a bitmap to indicate whether a corresponding MPDU or MSDU is successfully received. If an MPDU or MSDU is successfully received, the corresponding bit is set to 1. Otherwise, the corresponding bit is set to 0.

In subsequent embodiments, an MPDU in which acknowledgment policy subfield in the QoS field is set to normal block acknowledgment is referred to as a QoS data frame or a data frame (represented by data in the figure) for short.

Request-based block acknowledgment (BAR): The transmit end may send one A-MPDU or A-MPDUs and set an acknowledgment policy sub-field in a QoS field to block acknowledgment request. The receive end returns a BA frame based on a receiving status of each MPDU or MSDU only after the transmit end sends a BAR frame.

2. BAR Frame

Figure 5:
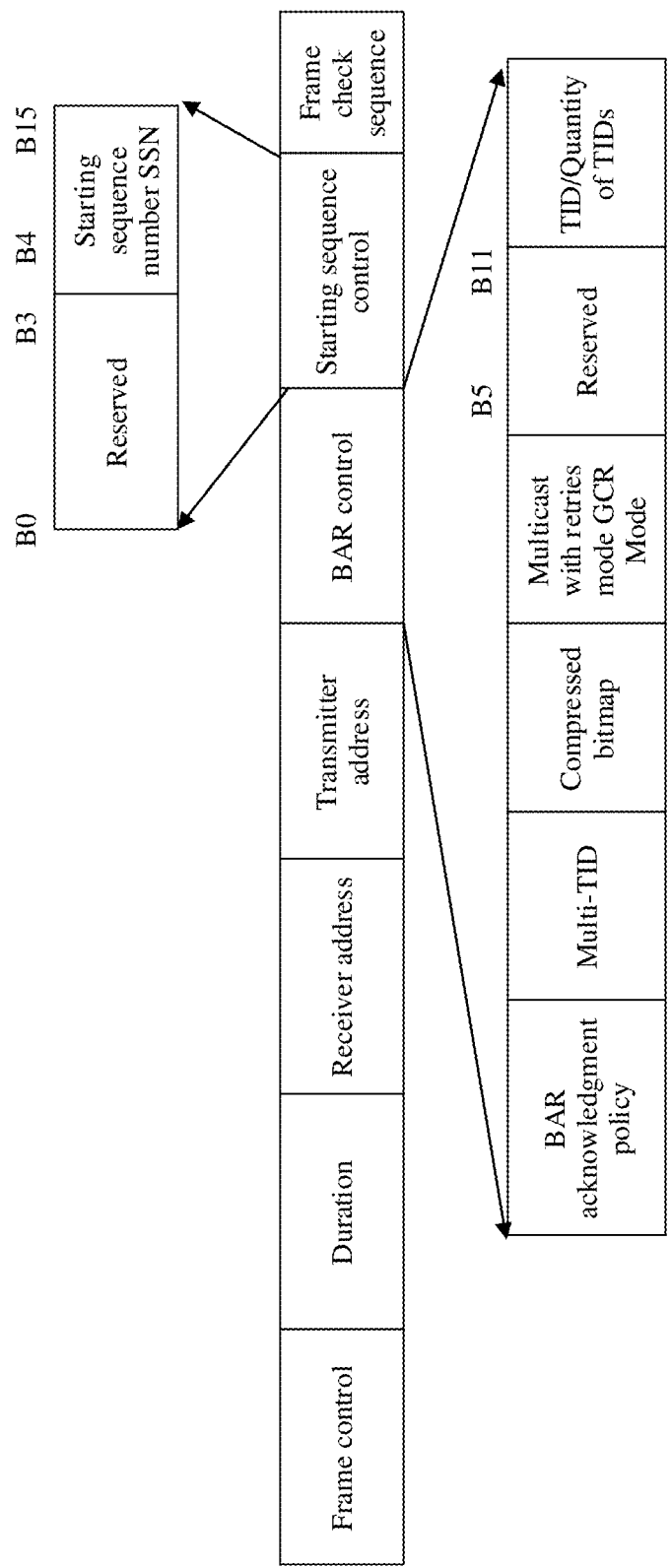
FIG. 5 is a schematic diagram of a BAR frame.

A format of a BAR frame is shown in FIG. 5. The BAR frame includes a frame control field, a duration field, a receiver address field, a transmitter address field, a BAR control field, a start sequence control field, a frame check sequence field, and the like. The BAR control field includes a BAR acknowledgment policy subfield, a multi-TID subfield, a compressed bitmap subfield, a multicast retransmission mode subfield, a TID/a quantity of TIDs subfield, a reserved subfield (B5 to B11), and the like. Meanings of main subfields are as follows:

BAR acknowledgment policy: This indicator bit is used for delayed block acknowledgment. For a delayed block acknowledgment session, if the indicator bit is set to 0, it indicates that the receive end returns, after a short interframe space (SIFS), an ACK after receiving the BAR frame. If the indicator bit is set to 1, it indicates that the receive end does not need to return an ACK after receiving the BAR frame.

Compressed bitmap: If this subfield is set to 1, the BAR requests the receive end to return a BA with a compressed bitmap.

TID/Quantity of TIDs: If a multi-TID indicator bit is not set to 1, this field carries a TID of this block acknowledgment session. If a multi-TID indicator bit is set to 1, this field carries a quantity of TIDs in a multi-TID BAR frame.

Start sequence control field: This field uses 12 bits (B4 to B15) to carry a starting sequence number (SSN).

Figure 6:
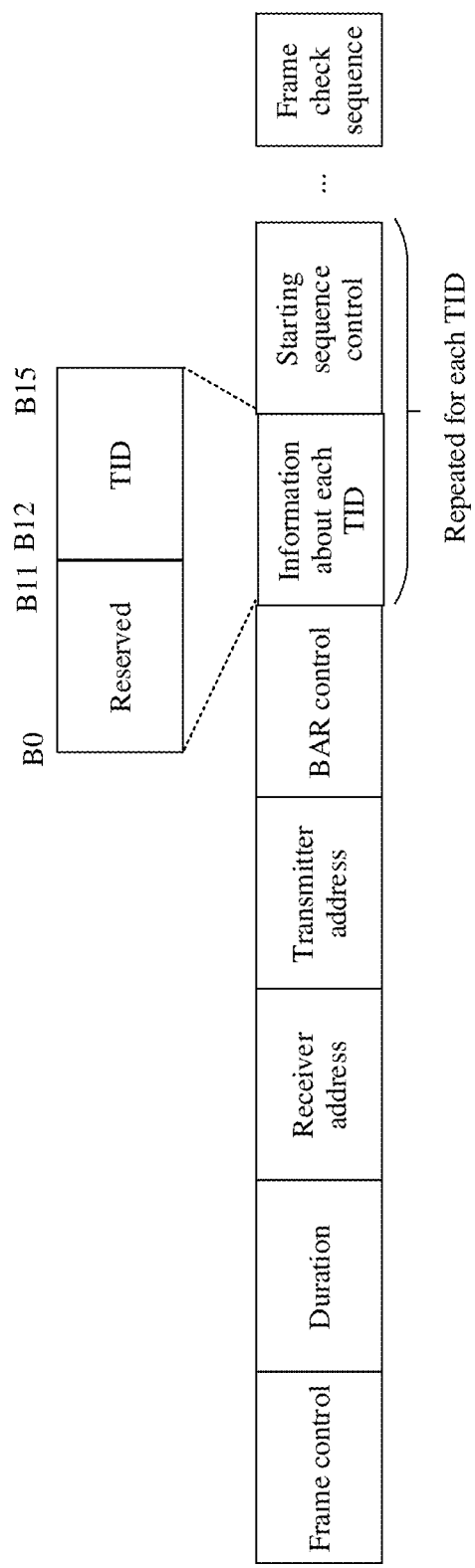
FIG. 6 is a schematic diagram of another BAR frame.

Multi-TID: This indicator bit indicates whether this BAR is a basic BAR frame or a multi-TID BAR frame. A frame format of a multi-TID BAR frame is shown in FIG. 6.

For a multi-TID BAR frame, each TID has a TID information field and a start sequence control field. Each TID information field includes a TID value, and the TID information field is followed by a sequence control field corresponding to the TID.

3. BA Frame

Figure 7:
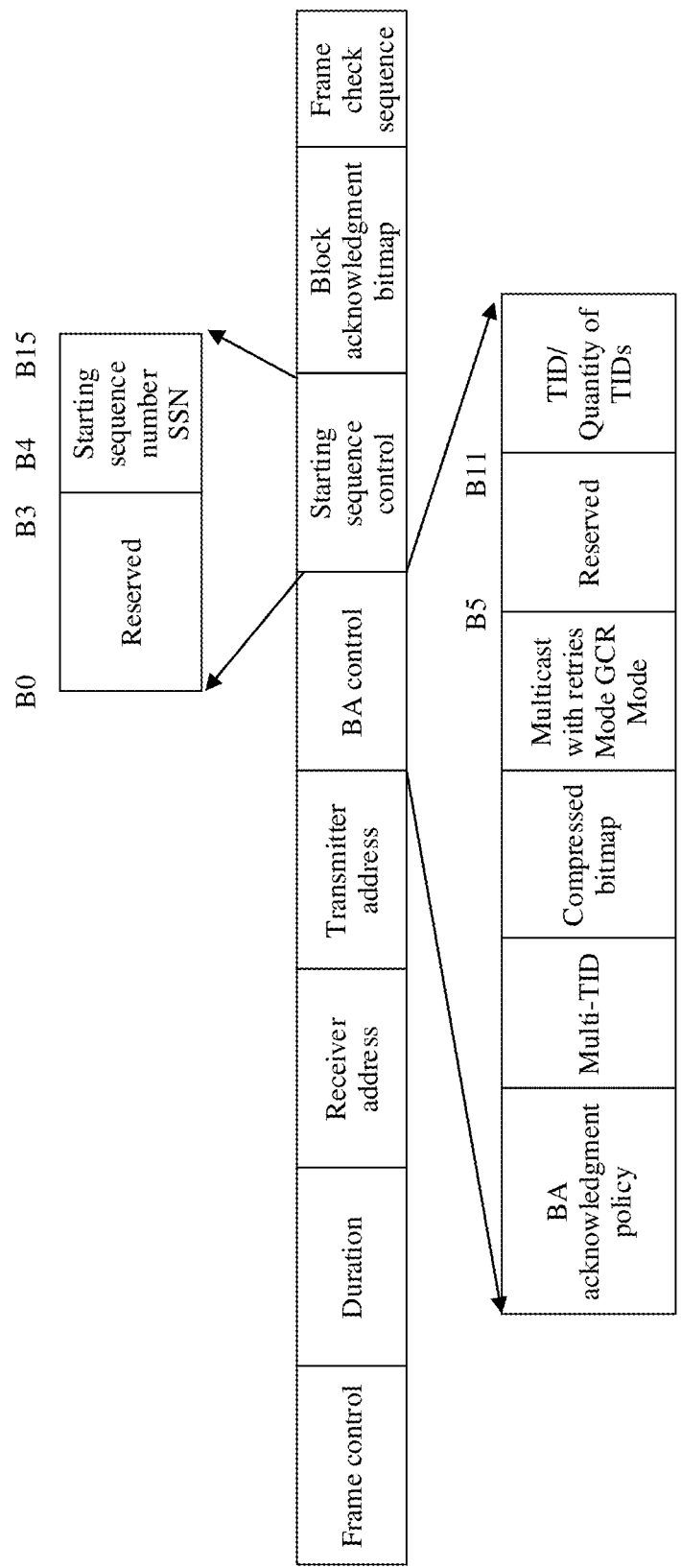
FIG. 7 is a schematic diagram of a BA frame.

A format of a BA frame is shown in FIG. 7. The BA frame includes a frame control field, a duration field, a receiver address field, a transmitter address field, a BA control field, a start sequence control field, a frame check sequence field, and the like. The BA control field includes a BA acknowledgment policy subfield, a multi-TID subfield, a compressed bitmap subfield, a multicast retransmission mode subfield, a TID/a quantity of TIDs subfield, a reserved subfield (B5 to B11), and the like. Meanings of main subfields are as follows:

BA acknowledgment policy: This indicator bit is used for delayed block acknowledgment. For a delayed block acknowledgment session, if this indicator bit is set to 0, the receive end returns an ACK message after SIFS after receiving the BA frame. If this bit is set to 1, the receive end does not need to return an ACK message after receiving the BAR frame.

Compressed bitmap: If this subfield is set to 1, it indicates that the BA frame includes a compressed or an 8-octet block acknowledgment bitmap. If this subfield is set to 0, the BA frame includes an uncompressed or 128-octet block acknowledgment bitmap.

TID/Quantity of TIDs: If a multi-TID indicator bit is not set to 1, this field carries a TID of this block acknowledgment session. If a multi-TID indicator bit is set to 1, this field carries a quantity of TIDs in a multi-TID BA frame.

Start sequence control field: 12 bits in this field carry a starting sequence number SSN.

Block acknowledgment bitmap: The block acknowledgment bitmap may be 128 octets in a case of uncompressed BA or may be 8 octets in a case of compressed BA. The bitmap indicates receiving statuses of a maximum of 64 MSDUs. In a case of uncompressed bitmap, each MSDU is represented by 16 bits, and each bit represents an MSDU fragment (if any). In a case of compressed bitmap, each MSDU is represented by a single bit. In this case, a receiving status of each fragment cannot be represented.

Figure 8:
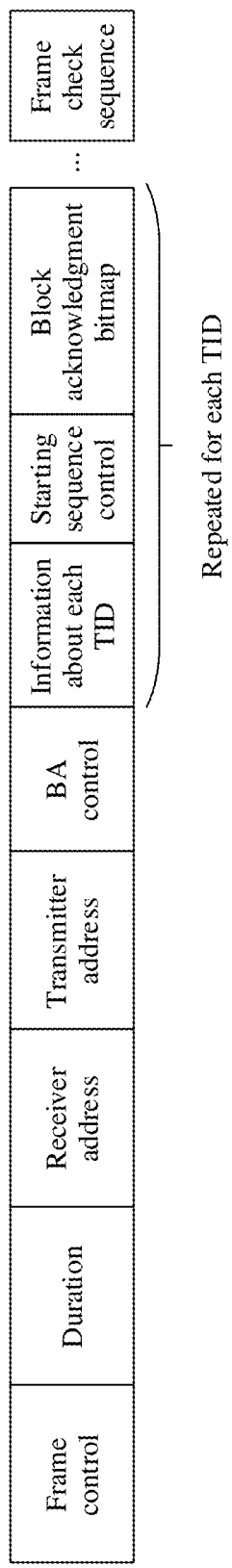
FIG. 8 is a schematic diagram of another BA frame.

Multi-TID: This indicator bit indicates whether this BA is a basic BA frame or a multi-TID BA frame. A frame format of a multi-TID BA frame is shown in FIG. 8.

For a multi-TID BA frame, each TID has a TID information field, a start sequence control field, and a BA bitmap field. Each TID information field includes a TID value, and the TID information field is followed by a sequence control field corresponding to the TID, and a BA bitmap.

4. Process of Establishing a Block Acknowledgment Session

If the block acknowledgment mechanism is expected to be used for one piece of TID data, a session is established by exchanging an add block acknowledgment (ADDBA) request frame/a response frame.

Initialization of a block acknowledgment session may start when an initiator sends an ADDBA request frame. A responder sends an ACK in response to a correctly received ADDBA request frame. After further processing, the responder sends an ADDBA response frame. If the initiator correctly receives the frame, the initiator responds with an ACK. If an expected ACK is not received, the initiator retransmits an ADDBA request and the responder retransmits an ADDBA response. If a session fails to be established, the session is detected by the initiator when timeout occurs after a period of inactivity.

The ADDBA request frame and the ADDBA response frame carry the following information:

Block acknowledgment policy: This field indicates whether the session is an immediate block acknowledgment session or a delayed block acknowledgment session.

TID: This field indicates a communication type of the session.

Buffer size: This field indicates a quantity of frame buffers used by the responder to reorder frames. If a value of the buffer size is set by the initiator, the value is the expected value. A value set by the responder is the actual value. A quantity of MPDUs that do not receive any response before the initiator requests a block acknowledgment cannot exceed the value of the buffer size.

Block acknowledgment timeout value: This field specifies duration before termination of a block acknowledgment session when there is no frame exchange in the session.

Starting sequence number: The starting sequence number indicates a sequence number of a first data frame sent by the initiator.

5. Scoreboard Mechanism and Window Starting Sequence Number (WinStart) Shift Mechanism For block acknowledgment, the receive end maintains a scoreboard data structure to record MPDUs that have been correctly received. When the receive end needs to return a BA, a scoreboard is converted into a bitmap. The BA frame further indicates a sequence number corresponding to a first bit in the bitmap, and subsequent bits correspond to subsequent sequence numbers. In the current protocol, a sequence number of a MAC service data unit (MSDU) is 12 bits, and a scoreboard indicates a window of a sequence number space with a size of 4096. A scoreboard window is defined by a window starting sequence number (WinStart), a window end sequence number (WinEnd), and a window size (WinSize).

Multi-link aggregation communication involves coordination between a plurality of links. MPDUs with a same TID at a data transmit end (the first multi-link device shown in FIG. 2) may be separately transmitted through a plurality of links: the link 1, the link 2, the link 3, and the link n, to increase a transmission rate of TID data. A data receive end (for example, the second multi-link device) sorts, based on a sequence number (SN) carried in each MPDU frame header, data packets with the same TID that are received over the plurality of links. According to the protocol, a MAC layer needs to deliver MPDUs to an upper layer in sequence.

However, the following problem may exist in sending of a BAR in multi-link aggregation: If a BAR sent over a link includes an SSN value set by the link, the receive end shifts the WinStart according to an existing WinStart shift rule. However, there are to-be-transmitted MPDUs that are with sequence numbers smaller than the SSN and that are on other links. Even if these MPDUs are sent and correctly received, the receive end discards the MPDUs.

Figure 9:
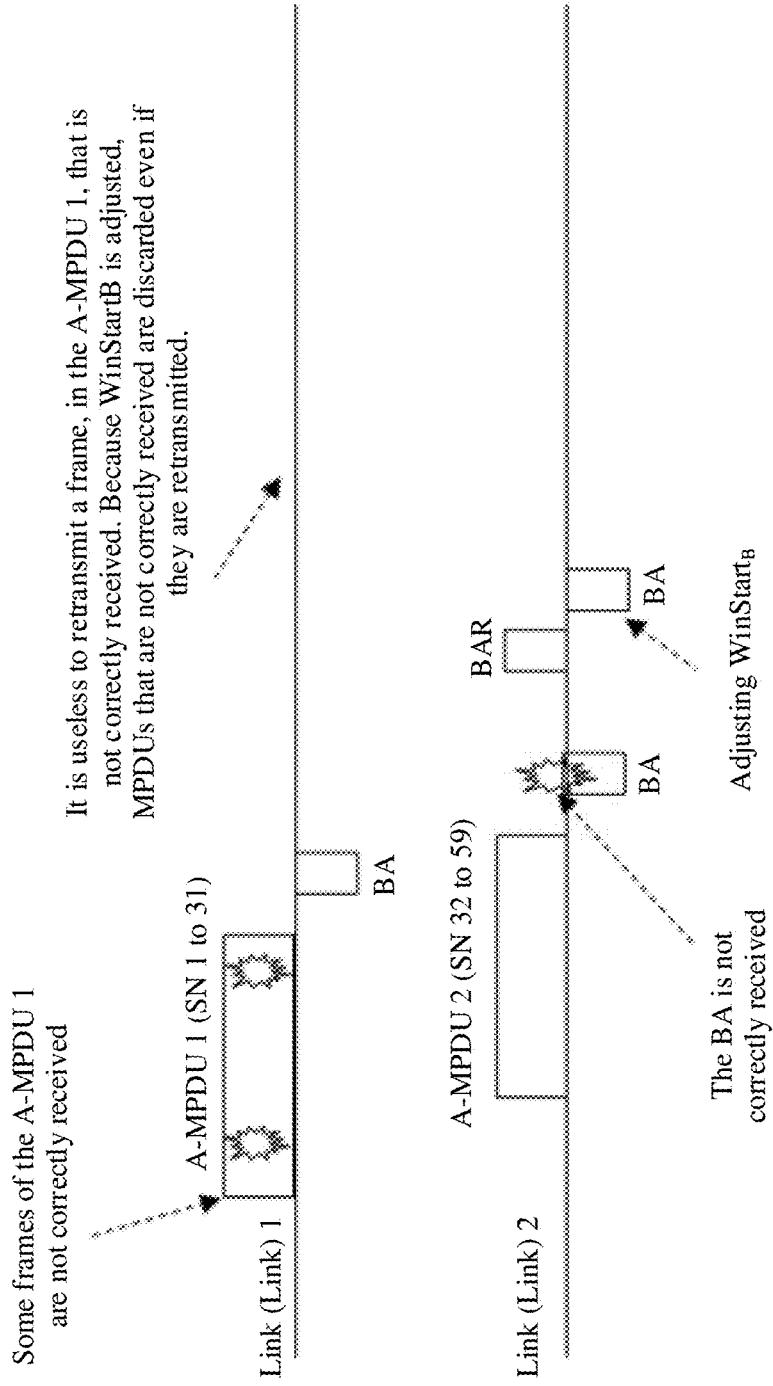
FIG. 9 is a schematic diagram of multi-link aggregation transmission.

For example, refer to FIG. 9.

A transmit end separately sends an A-MPDU 1 and an A-MPDU 2 over a link 1 and a link 2. SNs corresponding to MPDUs included in the A-MPDU 1 are 1 to 31, and SNs corresponding to MPDUs included in the A-MPDU 2 are 32 to 59. A receive end separately feeds back BAs to the transmit end over the link 1 and the link 2 and indicates MPDUs that are successfully received and MPDUs that are not successfully received. If the BA sent over link 2 is not successfully received by the transmit end, the transmit end sends a BAR frame over the link 2 to request the receive end to return the BA, where an SSN in the BAR frame is set to 32. After receiving the BAR frame, the receive end shifts WinStart to 32. As a result, in a subsequent retransmission process of MPDUs that are not correctly received in the A-MPDU 1, even if retransmitted MPDUs are successfully received by the receive end, the MPDUs are discarded because their SNs are smaller than WinStart.

To resolve the problem in the foregoing multi-link aggregation scenario, the following conventional technologies exist:

Conventional technology 1: In a multi-link aggregation scenario, each link uses a respective scoreboard.

Figure 10:
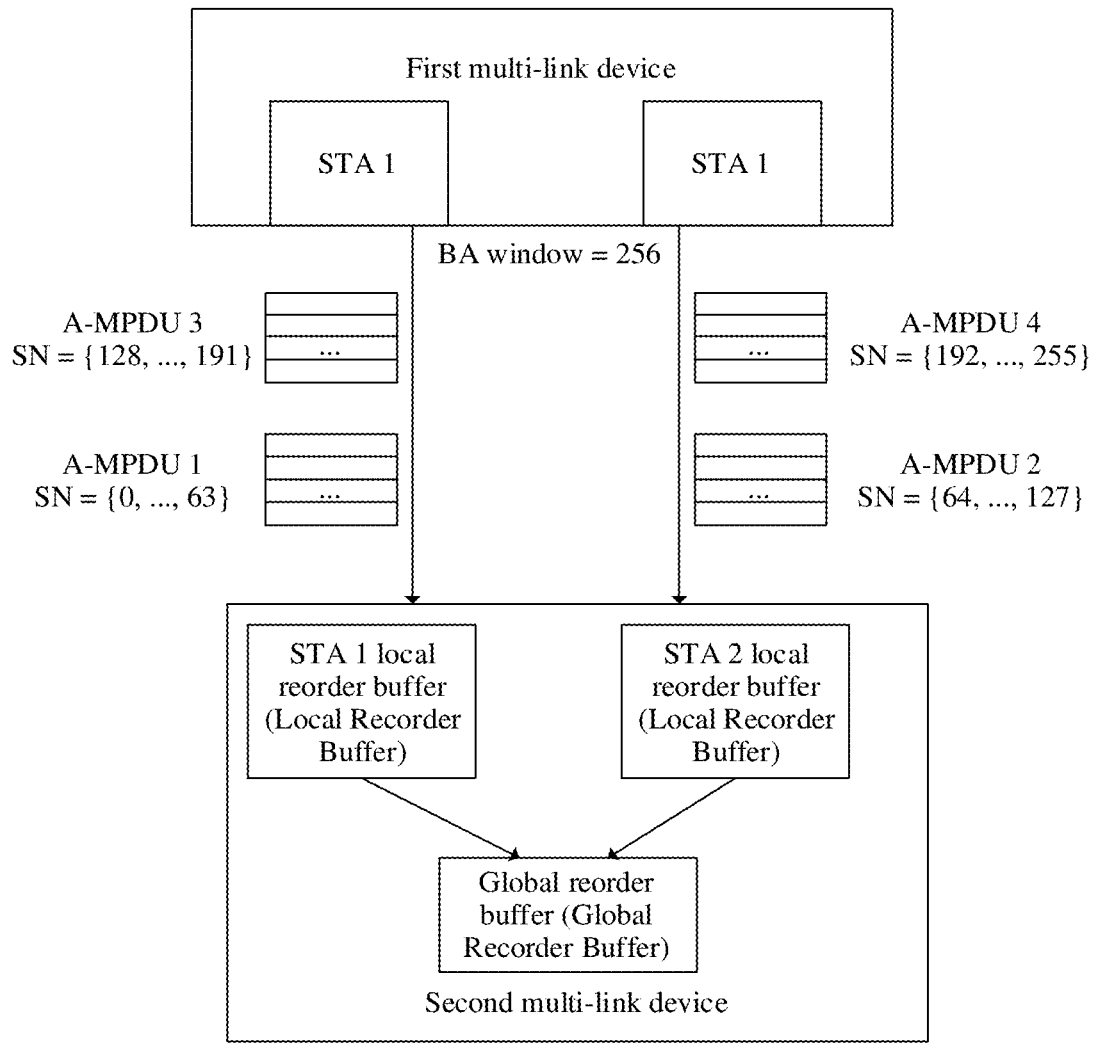
FIG. 10 is a diagram of a multi-link aggregation transmission architecture.
Figure 11:
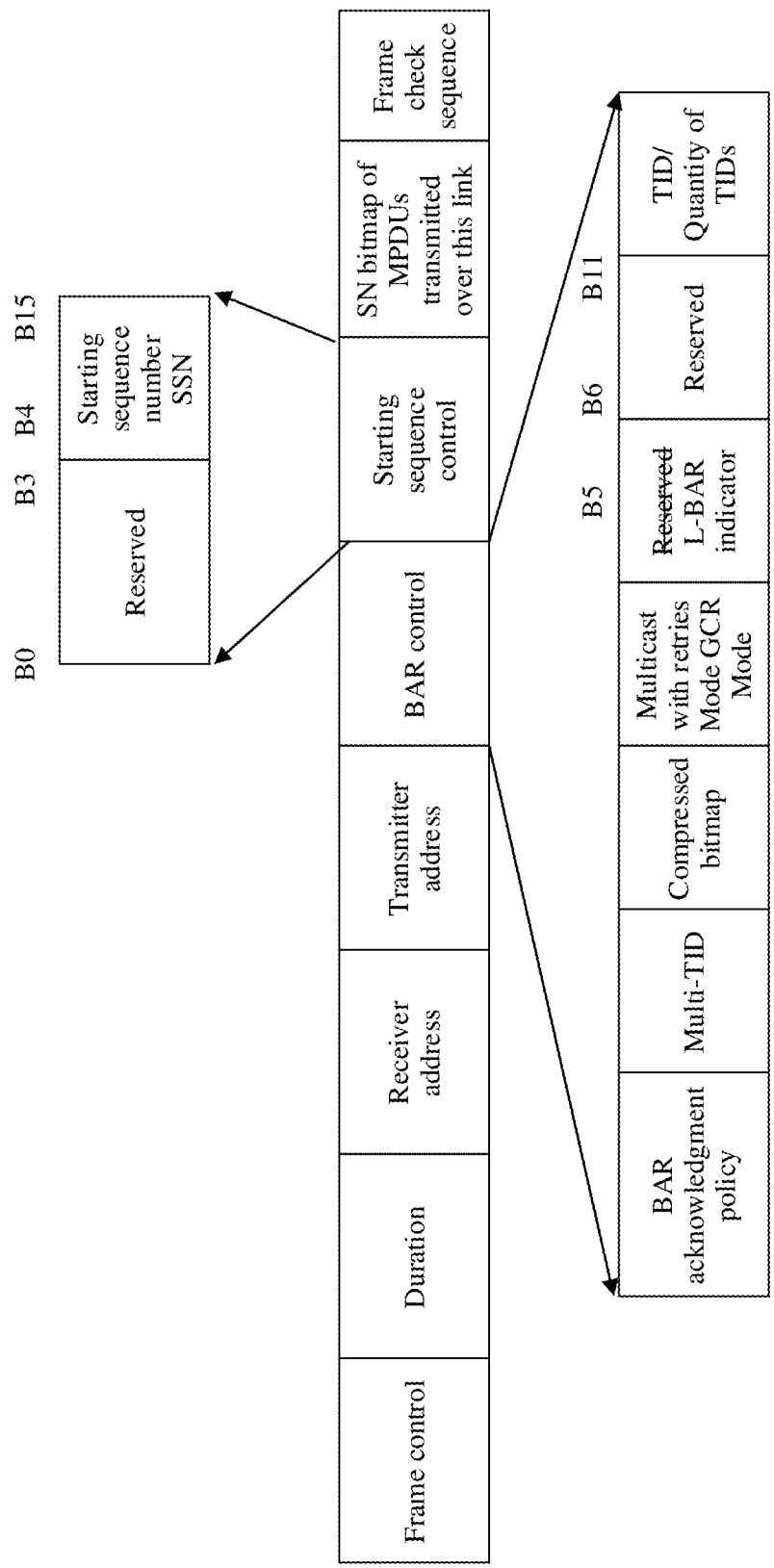
FIG. 11 is a schematic diagram of a changed BAR frame.

In a multi-link aggregation architecture shown in FIG. 10, there is a global reorder buffer configured for the receive end, and each link further has a local scoreboard or a local reorder buffer. To prevent MPDUs from waiting for a long time in a local buffer, a new BAR frame, namely, a local BAR (L-BAR), needs to be introduced. A frame format of the BAR frame is shown in FIG. 11.

Different from the BAR frame shown in FIG. 5 in which a reserved bit B5 indicates whether SN bitmap indication information of an MPDU transmitted over this link is carried, a reserved bit B5 in a local BAR frame indicates an SN range corresponding to MPDUs transmitted over this link, and an SN corresponding to a first bit is indicated by using a starting sequence number field.

After receiving the L-BAR frame, the receive end determines, based on the carried SN bitmap indication information of the MPDU transmitted over the link, how to shift a starting sequence number (WinStart) of a scoreboard window corresponding to the link.

In the conventional technology 1, a BAR frame in the conventional technology needs to be modified; for each link, SN bitmap indication information of an MPDU transmitted over the link also needs to be added. Signaling overheads are large.

Conventional technology 2: An SN of an MPDU sent by the transmit end is restricted.

Figure 12:
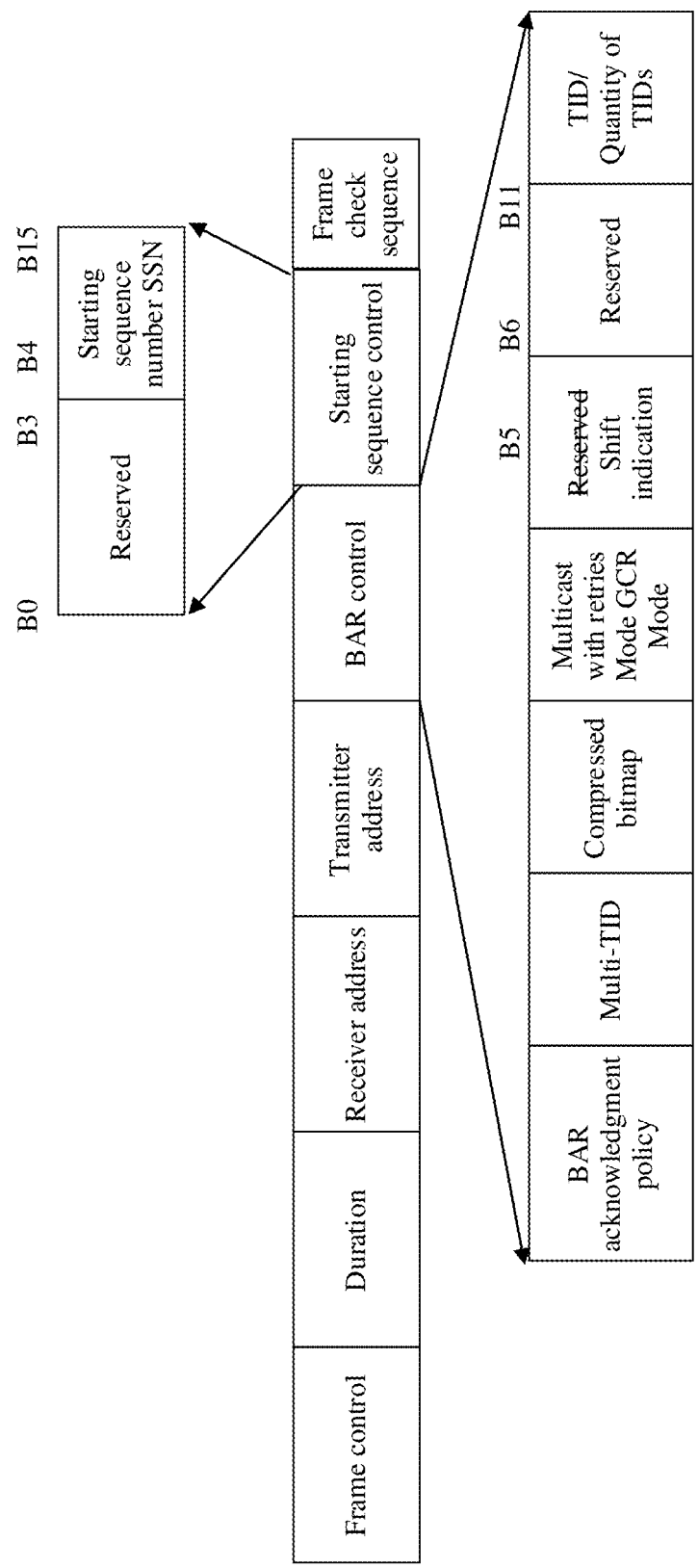
FIG. 12 is a schematic diagram of another changed BAR frame.

As shown in FIG. 12, a difference from the BAR frame structure shown in FIG. 5 lies in that, a reserved bit B5 in a structure of a BAR frame in FIG. 12 indicates whether a receive end needs to shift a starting sequence number (WinStart) of a scoreboard window based on the BAR frame, and a field corresponding to B5 may be referred to as a "shift indication".

When the transmit end expects the receive end to shift the starting sequence number (WinStart) of the scoreboard window based on the BAR frame, the transmit end needs to ensure that the SN of the MPDU sent by the transmit end is greater than the SSN carried in the BAR frame, that is, the MPDU whose SN is smaller than the SSN carried in the BAR frame cannot be sent.

In the conventional technology 2, the BAR frame in the conventional technology also needs to be modified, and a plurality of links of the transmit end need to interact with each other, to determine a case in which the receive end can shift the starting sequence number (WinStart) of the scoreboard window. When the receive end needs to shift the WinStart, the "shift indication" is set to 1. This undoubtedly increases complexity of the transmit end. In addition, in a non-colocation scenario, interaction between links increases a delay.

Conventional technology 3: An SSN of an MPDU sent by the transmit end is restricted.

In the conventional technology 3, when sending a BAR over a link, the transmit end needs to ensure that there is no to-be-transmitted MPDU over other links whose SSN is smaller than that carried in the BAR.

In the conventional technology 3, interaction between aggregation links of a transmit end is also required, which undoubtedly increases complexity of the transmit end. In addition, in a non-colocation scenario, interaction between links increases a delay.

For the foregoing problem and the disadvantages in the foregoing three conventional technologies, the embodiments may provide a scoreboard window starting sequence number (WinStart) shift rule for multi-link aggregation transmission.

A scoreboard window starting sequence number (WinStart) shift rule may act on the receive end, so that the receive end comprehensively determines, based on respective SSNs of a plurality of links, whether to shift WinStart.

It should be understood that the SSNs corresponding to the plurality of links may be respective SSNs of the plurality of links. Values of the SSNs of the links may be the same, or a part of the values may be different, or the values may be different from each other. The transmit end may uniformly set the SSNs of the links or may separately set the SSNs of the links. This is not limited.

The receive end may comprehensively consider the SSNs of the plurality of links and the following several cases may be included.

First, after receiving a BAR sent over a link, an SSN carried in the BAR and an SSN of another link maintained or stored by the receive end are comprehensively considered.

Second, at one time point, the receive end comprehensively considers SSNs, of a plurality of links, maintained or stored by the receive end.

Third, after a plurality of BARs simultaneously sent over a plurality of links may be received, SSNs that are carried in the plurality of BARs and that respectively correspond to the plurality of links may be comprehensively considered.

It should be understood that the plurality of links in the embodiments may be a plurality of links between the transmit end and the receive end. When determining, comprehensively based on respective SSNs of the plurality of links, whether to shift WinStart, the receive end may consider respective SSNs of all the plurality of links or may consider SSNs corresponding to at least two of the plurality of links.

In an implementation, to balance MPDUs sent over a plurality of links, when the receive end receives a BAR frame sent over one link, and the receive end performs adjustment on WinStart, the receive end not only considers an SSN carried in the BAR frame, but also needs to compare the SSN carried in the BAR frame with an SSN carried in a BAR sent over another link. The receive end selects a smallest value and adjusts a WinStart value to the smallest value of SSNs corresponding to the BARs sent over the plurality of links. In this way, a case in which an SN of a sent MPDU is smaller than WinStart does not occur. It should be understood that the SSN carried in the BAR sent over the another link has been stored in the receive end. Therefore, interaction does not need to be performed between the plurality of links at the transmit end.

In addition, when the receive end receives an MPDU sent over a link, if an SN corresponding to the data frame sent over the link falls outside a current scoreboard window but falls within half of a space range of a sequence window, WinStart is adjusted so that WinEnd is equal to the SN. If among the SSNs corresponding to the links stored in the receive end, there is an SSN smaller than the adjusted WinStart, WinStart is updated with the stored SSN smaller than WinStart.

The transmit end may not change a rule, in the conventional technology, for setting an SSN of a BAR frame, and a plurality of links of the transmit end do not need to interact with each other. The receive end adjusts WinStart based on receiving statuses of the plurality of links. In this method, a BAR frame in the conventional technology does not need to be modified, and interaction between a plurality of links of the transmit end is not mandatory. The method is applicable to a non-collocated multi-link aggregation scenario.

For example, for multi-link aggregation transmission, a new scoreboard window starting sequence number (WinStart) shift rule provided is as follows.

WinStart Shift Rule 1

An SSN of each link is initialized to SSN_0 and is carried in an ADDBA request/response frame.

When a BAR frame is received, WinStart shifts to min (SSN_1, SSN_2, . . . , SSN_N), where SSN_i is an SSN value on an aggregation link i.

When a QoS data frame is received, there are three cases.

If an SN of the data frame falls within a current scoreboard window, that is, WinStart<=SN<=WinEnd, an offset represented by the SN in the scoreboard is set to 1.

If an SN of the data frame falls outside a current scoreboard window but falls within half of a range of a sequence window space, that is, WinEnd<SN<WinStart+2^11, the scoreboard shifts rightwards to accommodate the SN. In other words, a starting sequence number of the scoreboard window is set to WinStart=SN−WinSize+1. If SSN_i is smaller than WinStart, WinStart is updated to SSN_i, where i=1, . . . , N.

If an SN of the data frame exceeds more than half of a sequence space outside the window, that is, WinStart+2^11<=SN<=WinStart, the scoreboard is not changed.

In another implementation, to take into account MPDUs sent over a plurality of links, when receiving a BAR frame sent over a link, the receive end records, as WinStart_x, a smallest value among an SSN value carried in the BAR frame and SSN values corresponding to other links, compares the smallest value with WinStart_y stored before the BAR frame is received, and uses a larger value of the two as current WinStart to adjust the scoreboard window. Then, the adjusted scoreboard window is used to process a data frame received over each link.

The receive end can adaptively adjust WinStart. In this way, MPDUs sent over multiple links are considered. In this method, interaction between the plurality of links is not required, and a BAR frame in the conventional technology does not need to be changed. Therefore, signaling overheads are reduced to a maximum extent while ensuring transmission over a plurality of links.

For example, for multi-link aggregation transmission, a new scoreboard window starting sequence number (WinStart) shift rule provided is as follows.

WinStart Shift Rule 2:

An SSN of each link is initialized to SSN_0 and is carried in an ADDBA request/response frame.

When the receive end receives a BAR frame over a link (link i), the receive end records, as WinStart_x, a smallest value in SSN_i carried in the BAR frame and an SSN of another link stored in the receive end, that is, records min(SSN_1, SSN_2, . . . , SSN_N) as WinStart_x; records, as WinStart_y, WinStart before the BAR frame is received; and shifts WinStart to max(WinStart_x, WinStart_y).

When the receive end receives a QoS data frame, there are three cases:

If an SN of the data frame falls within a current scoreboard window, that is, WinStart<=SN<=WinEnd, an offset represented by the SN in the scoreboard is set to 1.

If an SN of the data frame falls outside a current scoreboard window but falls within half of a range of a sequence window space, that is, WinEnd<SN<WinStart+2^11, the scoreboard shifts rightwards to accommodate the SN, and a current starting sequence number WinStart of the scoreboard window is set to WinStart=SN−WinSize+1.

If an SN of the data frame exceeds more than half of a sequence space outside the window, that is, WinStart+2^11<=SN<=WinStart, the scoreboard is not changed.

Figure 13:
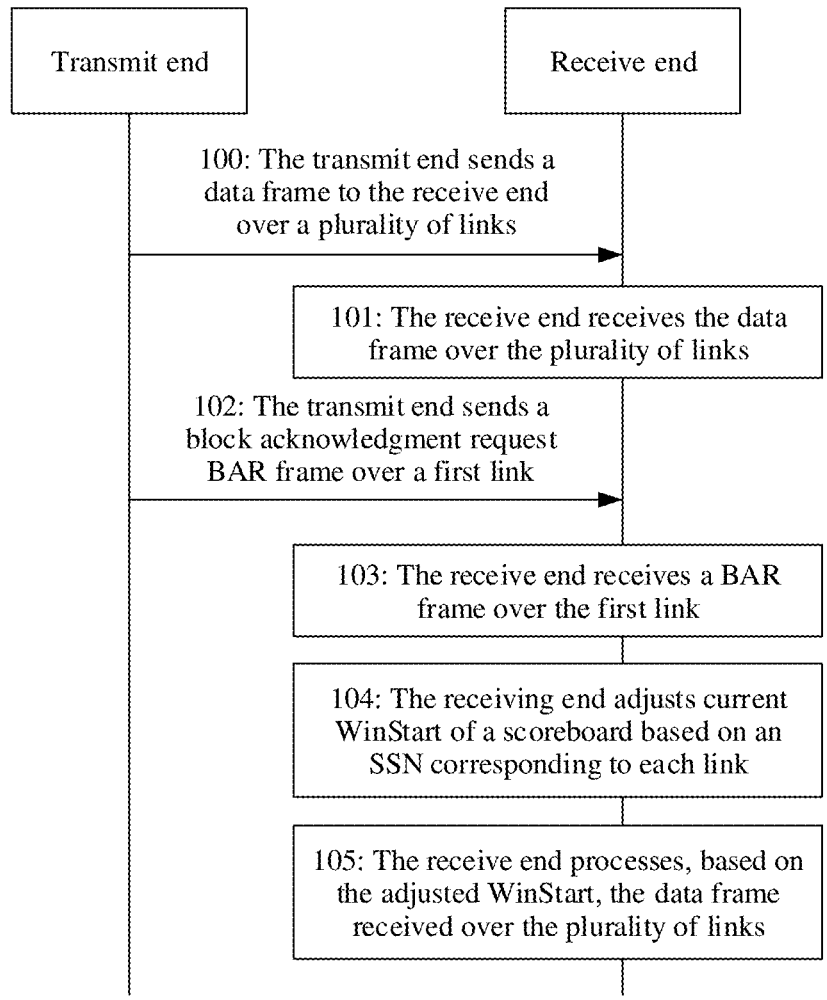
FIG. 13 is a schematic flowchart of multi-link aggregation transmission according to an embodiment.

Based on the foregoing rules of sending a BAR by the transmit end and the WinStart shift rule executed by the receive end, in the network system shown in FIG. 1 and the structures of the multi-link device shown in FIG. 2 to FIG. 4, a method for implementing multi-link aggregation transmission is shown in FIG. 13. The method includes the following steps.

Step 100: A transmit end sends data frames (MPDUs) to a receive end over a plurality of links, where SSNs corresponding to data frames sent over different links may be the same or different.

Step 101: The receive end receives the data frames over the plurality of links.

Step 102: The transmit end sends a block acknowledgment request BAR frame over a first link, where the BAR frame carries a starting sequence number SSN_1 corresponding to the first link.

In an optional implementation, the SSN_1 is a sequence number of a next data frame to be sent over the first link, or the SSN_1 is greater than a sequence number of a data frame discarded by the transmit end over the first link.

Step 103: The receive end receives a block acknowledgment request BAR frame over the first link.

Step 104: The receive end adjusts a value of a current starting sequence number WinStart of a scoreboard window based on respective SSNs of the plurality of links.

Step 105: The receive end processes, based on the adjusted WinStart, the data frames received over the plurality of links.

It should be noted that the foregoing procedure is merely an example. A sequence of sending a data frame and a BAR frame on each link is not limited, and a time sequence of receiving a data frame and a BAR frame by the receive end is not limited.

The transmit end may be the AP shown in FIG. 1, and correspondingly the receive end is the STA 2. Alternatively, the transmit end is the STA 2, and the receive end is the AP. Alternatively, the transmit end is the STA 4, and the receive end is the STA 5. Alternatively, the transmit end is the STA 5, and the receive end is the STA 4. Alternatively, the transmit end is the first multi-link device shown in FIG. 2, the receive end is the second multi-link device, and the plurality of links are respectively the link 1, the link 2, the link 3, . . . , and the link n.

Step 100 and step 102 performed by the transmit end may be performed by the transceiver 205 of the multi-link device 200 shown in FIG. 3A or may be performed by the sending module 302 in the first multi-link communication apparatus shown in FIG. 3B or may be performed by the interface 302 in the chip system shown in FIG. 4.

Steps 101 and 103 performed by the receive end may be performed by the transceiver 205 of the multi-link device 200 shown in FIG. 3A, and step 104 may be performed by the processor 201. Steps 101 and 103 performed by the receive end may alternatively be performed by the receiving module 401 of the second multi-link communication apparatus shown in FIG. 3B, and step 104 and step 105 may be performed by the processing module 402. Alternatively, step 101 and step 103 may be performed by the interface 302 in the chip system shown in FIG. 4, and step 104 and step 105 may be performed by the processor 301.

An SSN corresponding to each link, scoreboard window parameters including WinStart and WinSize, and the like are further stored in the receive end. Optionally, WinEnd may be further stored. This may be implemented by the memory 202 shown in FIG. 3A or the memory 303 shown in FIG. 4. A form is not limited to a table or the like.

Embodiment 1

The embodiment 1 describes the scoreboard window starting sequence number (WinStart) shift rule 1, in a link aggregation transmission solution shown in FIG. 13, that is implemented.

Figure 14:
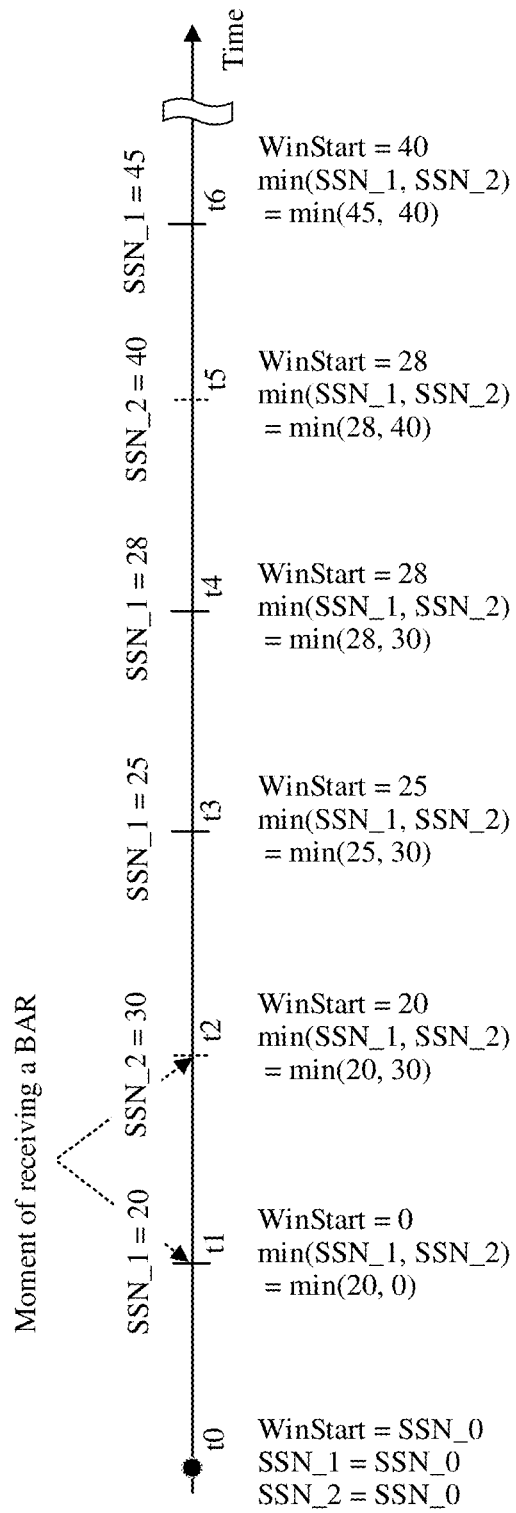
FIG. 14 is another schematic flowchart of multi-link aggregation transmission according to an embodiment.

In FIG. 14, an example in which a transmit end sends MPDUs to a receive end over two aggregation links is used for description. Acknowledgment policy fields of the MPDUs are set to the request-based block acknowledgment policy, and there is no SN of any one of the MPDUs that falls within WinEnd<SN<WinStart+2^11.

In this scenario, a WinStart shift process executed by the receive end is as follows.

At an initial moment t0, both SSN_1 and SSN_2 are initialized to SSN_0, where SSN_0 is a starting sequence number carried in an ADDBA request sent by the transmit end and an ADDBA response frame sent by the receive end to the transmit end, and SSN_1 and SSN_2 are SSN values carried in BAR frames received on the aggregation link 1 and the aggregation link 2, respectively. The receive end sets WinStart to min(SSN_1, SSN_2)=min(0, 0)=0.

At a moment t1, the receive end receives a BAR frame on the aggregation link 1, where SSN_1 carried in the BAR frame is 20, and then the receive end sets WinStart to min(SSN_1, SSN_2)=min(20, 0)=0.

At a moment t2, the receive end receives a BAR frame on the aggregation link 2, where SSN_2 carried in the BAR frame is 30, and then the receive end sets WinStart to min(SSN_1, SSN_2)=min(20, 30)=20.

At a moment t3, the receive end receives a BAR frame on the aggregation link 1, where SSN_1 carried in the BAR frame is 25, and then the receive end sets WinStart to min(SSN_1, SSN_2)=min(25, 30)=25.

At a moment t4, the receive end receives a BAR frame on the aggregation link 1, where SSN_1 carried in the BAR frame is 28, and then the receive end sets WinStart to min(SSN_1, SSN_2)=min(28, 30)=28.

At a moment t5, the receive end receives a BAR frame on the aggregation link 2, where SSN_2 carried in the BAR frame is 40, and then the receive end sets WinStart to min(SSN_1, SSN_2)=min(28, 40)=28.

At a moment t6, the receive end receives a BAR frame on the aggregation link 1, where SSN_1 carried in the BAR frame is 45, and then the receive end sets WinStart to min(SSN_1, SSN_2)=min(45, 40)=40.

The rest can be deduced by analogy.

In the embodiment 1, to balance MPDUs sent over a plurality of links, when the receive end receives a BAR frame sent over one link, and the receive end performs adjustment on WinStart, the receive end not only considers an SSN carried in the BAR frame, but also needs to compare the SSN carried in the BAR frame with an SSN carried in a BAR sent over another link. The receive end selects a smallest value and adjusts a WinStart value to the smallest value of SSNs corresponding to the BARs sent over the plurality of links. In this way, an SN of a sent MPDU is not smaller than WinStart, so that the receive end does not discard an MPDU when the MPDU is correctly received.

Embodiment 2

The embodiment 2 describes the scoreboard window starting sequence number (WinStart) shift rule 1, in the link aggregation transmission solution shown in FIG. 13, that is implemented, and a manner of processing, based on the WinStart shift rule 1, MPDUs sent over a plurality of links.

Figure 15:
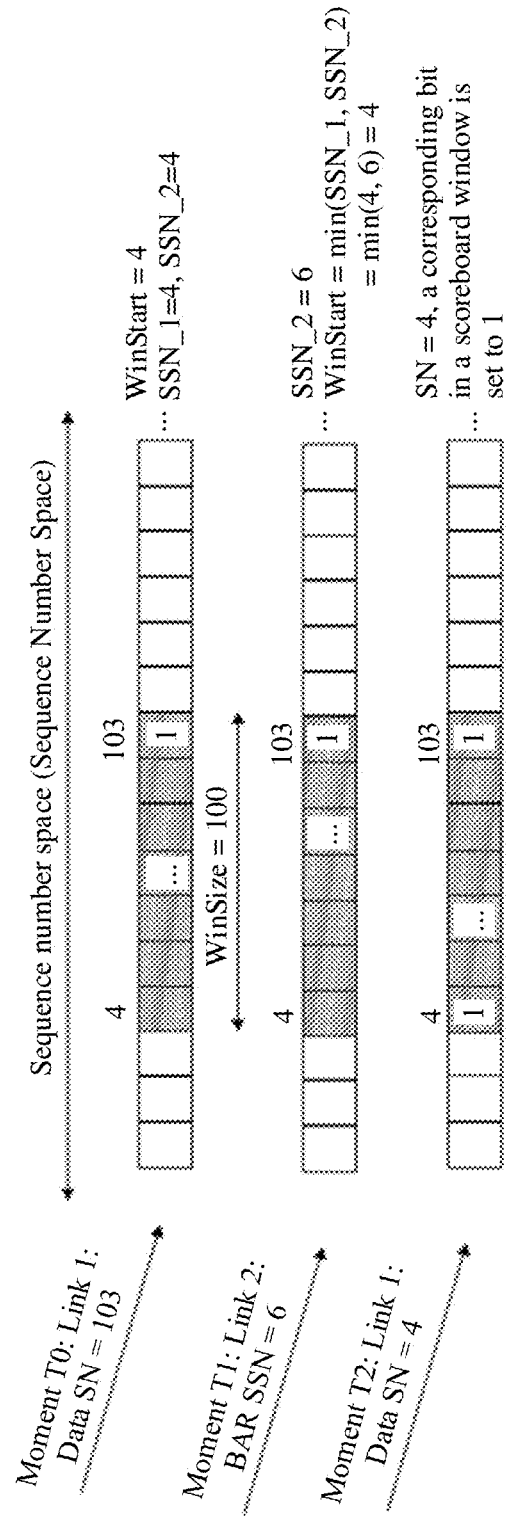
FIG. 15 is another schematic flowchart of multi-link aggregation transmission according to an embodiment.

As shown in FIG. 15, an example in which a multi-link device on the transmit end sends MPDUs to the receive end over two links, the link 1 and the link 2, is still used, and a scoreboard window is WinStart=4, WinSize=100, and WinEnd=103.

First, the SSN in the ADDBA request/response frame is set to 4, and both SSN_1 and SSN_2 may be initialized to 4. It is assumed that only the block acknowledgment policy is used on the link 1 and the link 2, and the transmit end has not sent a BAR frame before and has not sent an MPDU whose SN is greater than 103 (shown as Data in the figure).

At a moment T0, the transmit end sends an MPDU to the receive end over the link 1, where an SN of the MPDU is 103. WinStart<SN=WinEnd=103 is satisfied. Therefore, in a sequence number space, a corresponding bit at an offset corresponding to the SN (that is, the sequence number is 103) is set to 1, to indicate that the MPDU corresponding to SN=103 is successfully received.

At a moment T1, the transmit end sends a BAR frame carrying SSN=6 over the link 2. The receive end adjusts a value of WinStart to a smaller value of SSNs corresponding to the two links, that is, WinStart=min(SSN_1, SSN_2)=min (4, 6)=4. The receive end stores SSN_1=4, SSN_2=6, WinStart=4 and WinEnd=103.

At a moment T2, the transmit end retransmits, over the link 1, an MPDU with SN=4. WinStart=SN<WinEnd is satisfied. Therefore, a corresponding bit at an offset corresponding to the SN (that is, the sequence number is 4) is set to 1, to indicate that the MPDU corresponding to SN=4 is successfully received. The receive end stores SSN_1=4, SSN_2=6, WinStart=4 and WinEnd=103.

Figure 16:
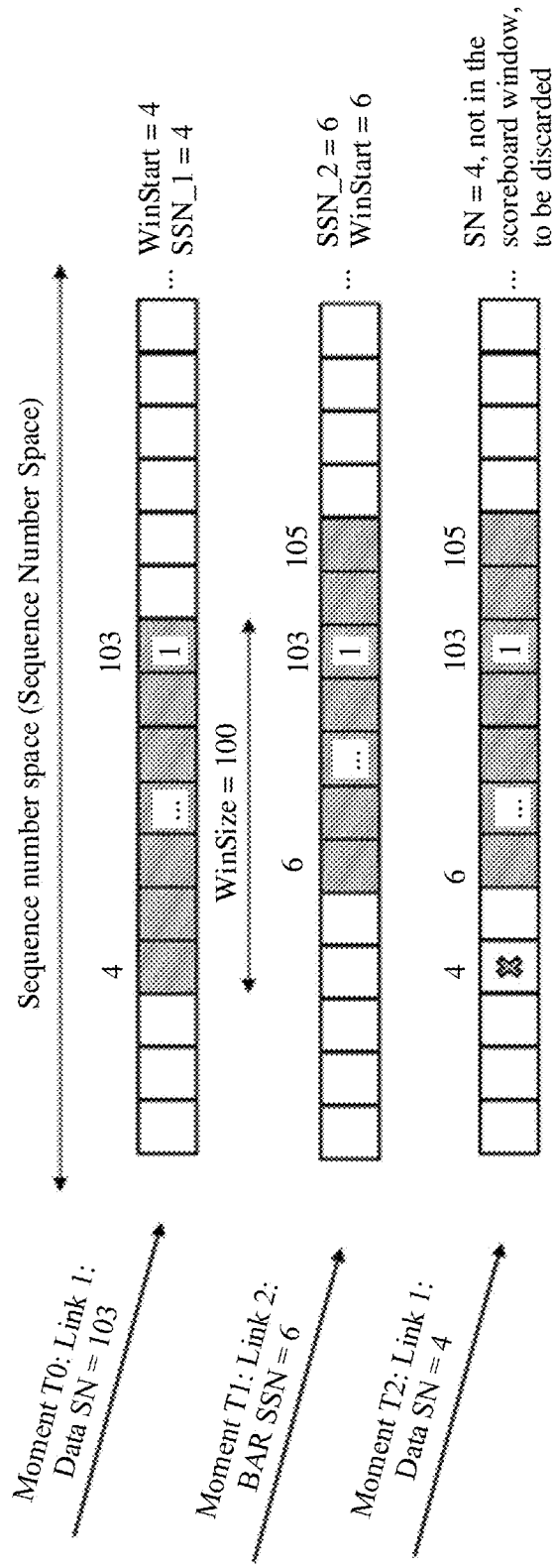
FIG. 16 is a schematic flowchart of multi-link aggregation transmission.

Comparatively speaking, if the starting sequence number (WinStart) shift rule of the scoreboard provided in the conventional technology is used in the same scenario, as shown in FIG. 16, at the moment T1, the transmit end sends a BAR frame over the link 2, where SSN carried in the BAR frame is 6, and the receive end adjusts WinStart to SSN corresponding to the BAR, that is, WinStart=SSN_2=6.

At the moment T2, the transmit end sends an MPDU with SN=4 over the link 1. Because SN=4<WinStart, even if the MPDU corresponding to the SN is successfully received by the receive end, the MPDU is discarded or deleted by the receive end.

It can be understood by comparing the multi-link transmission solution provided in FIG. 15 with the multi-link transmission solution provided in the conventional technology in FIG. 16 that, according to the scoreboard window starting sequence number (WinStart) shift rule 1 provided in this embodiment, the MPDU corresponding to SN=4 is successfully received by the receive end and is not discarded or deleted. In addition, according to the scoreboard window starting sequence number (WinStart) shift rule, when sending a BAR frame, the transmit end does not need to ensure that there is no sequence number of any to-be-transmitted MPDU on another link is smaller than an SSN in the BAR frame and does not need to modify an existing BAR frame. Therefore, when a structure of the original BAR frame is maintained, indication overheads are greatly reduced, and MPDUs on a plurality of links are correctly received.

FIG. 15 is merely an example. A problem shown in FIG. 9 can also be resolved using the scoreboard window starting sequence number (WinStart) shift rule. For example, when SSN_2 carried in the BAR sent by the transmit end over the link 2 is 32, MPDUs whose SNs are 1 to 31 in the A-MPDU 1 are sent by the transmit end over the link 1. If corresponding SSN_1=1, the receive end adjusts WinStart to a smaller value, that is, WinStart=min(SSN_1, SSN_2)=min(1, 32)=1. Therefore, when an error MPDU in the A-MPDU 1 is subsequently retransmitted over the link 1, the MPDU is not discarded or deleted by the receive end.

According to the embodiment 2, when receiving a BAR frame, the receive end adjusts WinStart according to an SSN carried in the BAR frame and a smallest value of SSNs of links that are maintained or stored by the receive end, thereby avoiding a misoperation on an MPDU (an SN of the MPDU is smaller than the SSN carried in the BAR frame) to be sent over another link.

Embodiment 3

The embodiment 3 describes, by using an example, a multi-link transmission solution in which the scoreboard window starting sequence number (WinStart) shift rule 1 may be applied.

Figure 17:
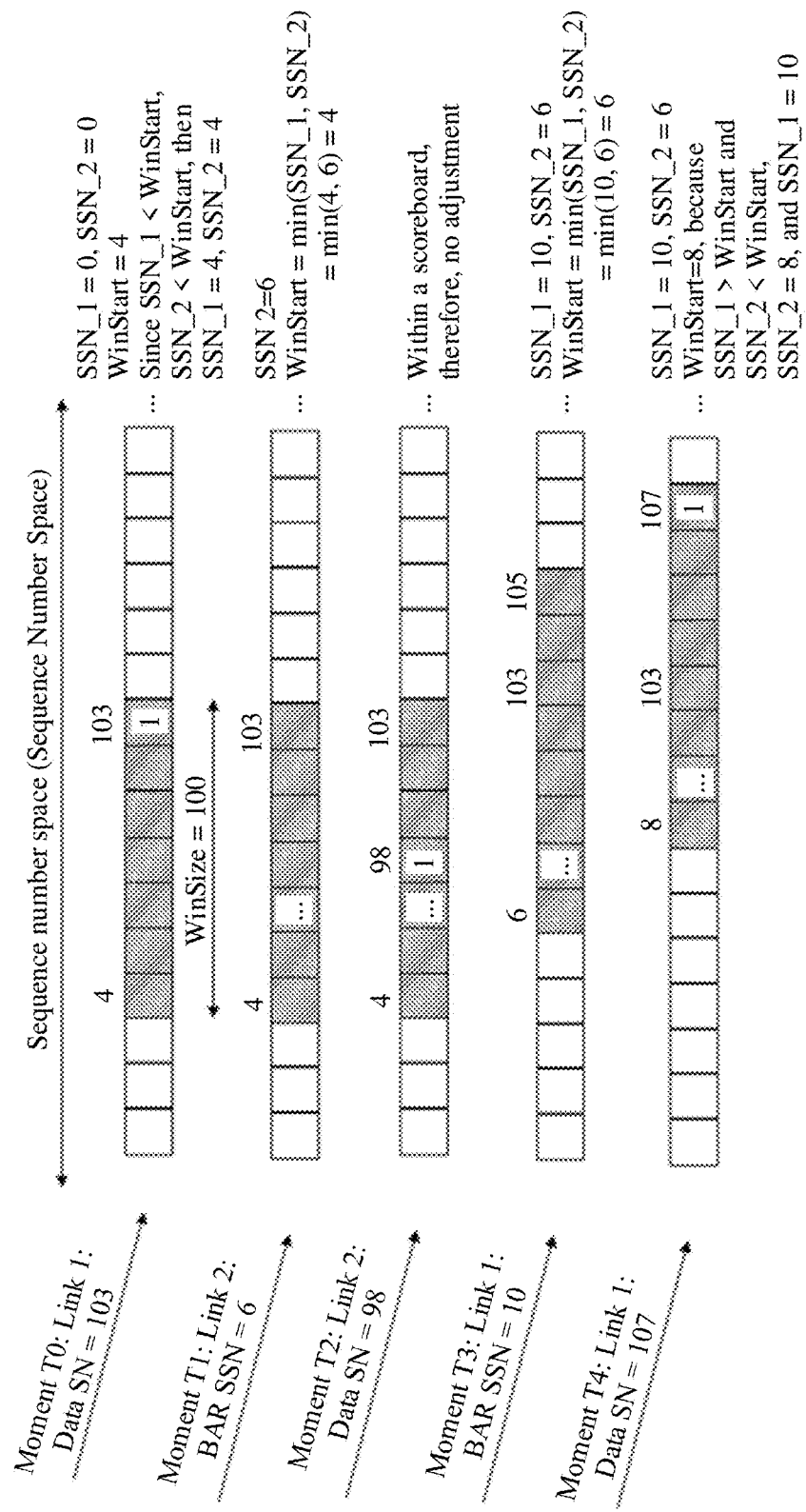
FIG. 17 is another schematic flowchart of multi-link aggregation transmission according to an embodiment.

As shown in FIG. 17, it is assumed that a scoreboard size WinSize is 100, an SSN in an ADDBA request/response frame is set to 0, and SSN_1 and SSN_2 stored in the receive end are initialized to 0. It is assumed that only the block acknowledgment policy is used on the link 1 and the link 2, and the transmit end has not sent a BAR frame before and has not sent a data frame whose SN is greater than 99.

At a moment T0, the transmit end sends a data frame whose SN is 103 over the link 1. The data frame falls outside the scoreboard window but falls within half of a sequence number space, and therefore, the receive end shifts WinStart to 4. Because SSN_1=0, SSN_2=0, SSN_1<WinStart, SSN_2<WinStart, the receive end updates SSN_1 and SSN_2 stored in the receive end to WinStart, that is, SSN_1=4, SSN_2=4.

At a moment T1, the transmit end sends a BAR frame with SSN=6 over the link 2. The receive end updates SSN_2 stored in the receive end to 6 and shifts WinStart to min (SSN_1, SSN_2)=min (4, 6)=4.

At a moment T2, the transmit end sends a data frame whose SN is 98 over the link 2. Because the data frame falls within the scoreboard window, the receive end sets a corresponding offset (98) to 1 in the sequence number space, which indicates that the data frame is correctly received and is not deleted or discarded. The receive end does not shift WinStart.

At a moment T3, the transmit end sends a BAR frame with SSN=10 over the link 1. The receive end updates SSN_1 stored in the receive end to 10 and shifts WinStart to min(SSN_1, SSN_2)=min (10, 6)=6.

At a moment T4, the transmit end sends a data frame with SN=107 over the link 1. The data frame falls outside the scoreboard window but falls within half of the sequence number space, and therefore the receive end shifts WinStart to WinEnd−WinSize+1=107−100+1=8. In this way, the data frame with SN=107 can be correctly received, and an offset corresponding to the data frame in the sequence number space is set to 1. Because SSN_1=10, SSN_2=6, SSN_1 WinStart, SSN_2<WinStart, the receive end updates SSN_2 stored in the receive end to WinStart, that is, SSN_2=WinStart=8; SSN_1=10 remains unchanged.

It should be understood that operations of setting the offset corresponding to SN=107 to 1 and adjusting WinStart are not performed in a time sequence.

In the embodiment 3, when receiving a BAR frame, the receive end adjusts the WinStart based on the SSN carried in the BAR frame and the smallest value of SSNs, of all links, maintained or stored by the receive end; when receiving a data frame sent over one link, the receive end may also adjust WinStart based on an SN corresponding to the data frame, and adaptively adjust the value of the SSN stored in the receive end. According to the embodiment 3, it can be ensured that data frames sent over a plurality of links are correctly received and are not deleted by mistake, thereby improving data transmission efficiency.

Embodiment 4

The embodiment 4 describes the scoreboard window starting sequence number (WinStart) shift rule 2, in the link aggregation transmission solution shown in FIG. 13, that is implemented, and a manner of processing, based on the WinStart shift rule 2, MPDUs sent over a plurality of links.

Figure 18:
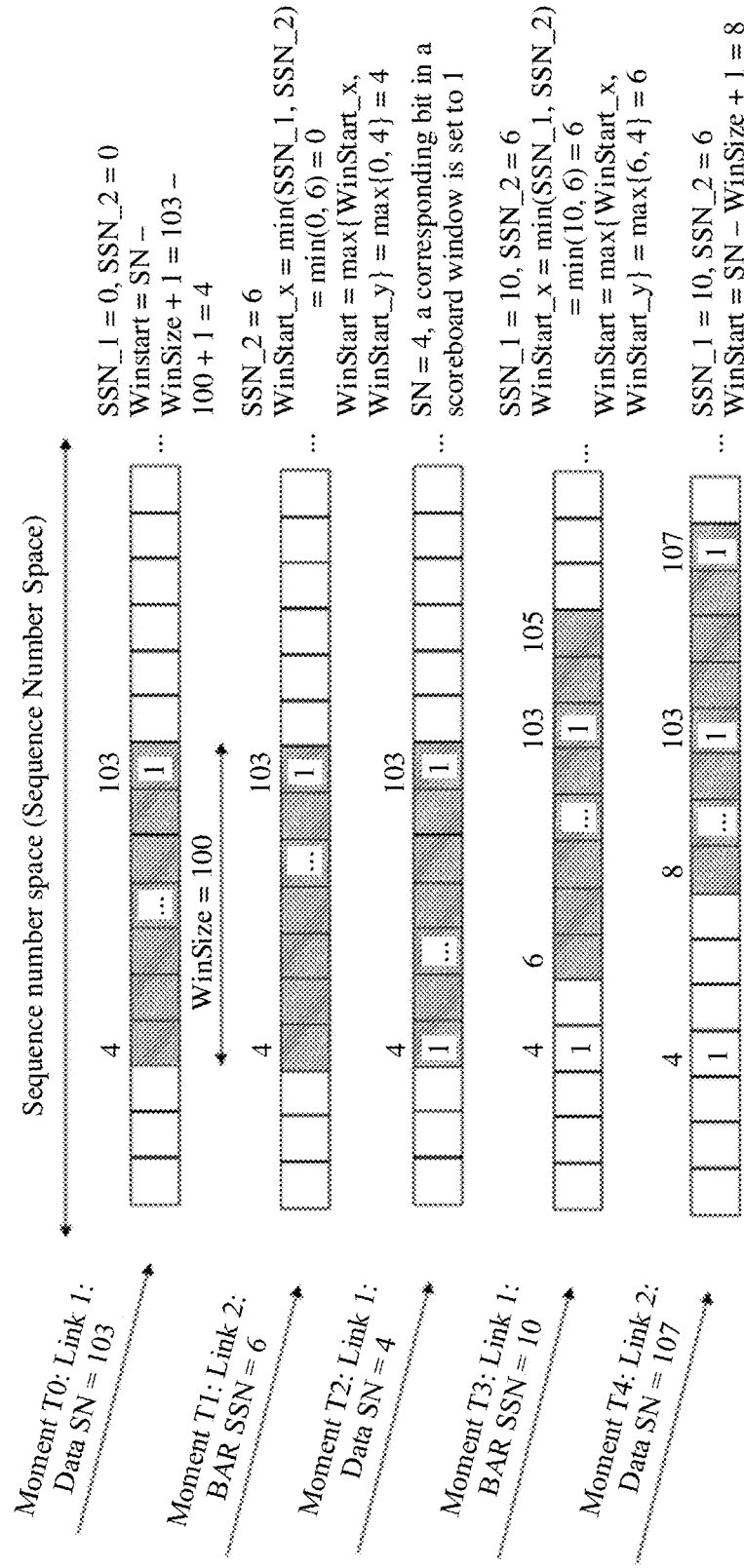
FIG. 18 is another schematic flowchart of multi-link aggregation transmission according to an embodiment.

For details, refer to FIG. 18. An example in which a multi-link device on the transmit end sends MPDUs to the receive end over two links, the link 1 and the link 2, is still used, and a scoreboard window is WinStart=4, WinSize=100, and WinEnd=103.

First, the SSN in the ADDBA request/response frame is set to 0, and both SSN_1 and SSN_2 may be initialized to 0. It is assumed that only the block acknowledgment policy is used on the link 1 and the link 2, and the transmit end has not sent a BAR frame before and has not sent an MPDU whose SN is greater than 99 (shown as Data in FIG. 18).

At a moment T0, the transmit end sends an MPDU whose SN is 103 to the receive end over the link 1. The SN of the data frame falls outside a current scoreboard window but within half of a sequence window space, that is, WinEnd<SN<WinStart+2^11. The scoreboard shifts rightwards to accommodate the SN, sets the starting sequence number of the current scoreboard window to WinStart=SN−WinSize+1=103−100+1=4, and sets a bit corresponding to an offset corresponding to the SN (that is, the sequence number is 103) in the sequence number space to 1, which indicates that the MPDU corresponding to SN=103 is successfully received.

Different from the shift rule 1 applied in the embodiment 2, in the embodiment 4, the shift rule 2 is applied. In this case, SSN_1 and SSN_2 stored in the receive end are not updated, and SSN_1=0 and SSN_2=0, still.

At a moment T1, the transmit end sends a BAR frame carrying SSN=6 over the link 2. The receive end records a smaller value of SSNs corresponding to the two links as WinStart_x, that is, WinStart_x=min(SSN_1, SSN_2)=min (0, 6)=0. The receive end compares WinStart_x and WinStart_y before receiving the BAR frame (that is, WinStart at a moment T0), and uses a larger value as current WinStart, that is, WinStart=max {WinStart_x, WinStart_y}=max {0, 4}=4.

The receive end stores SSN_1=0, SSN_2=6, and WinStart=4.

At a moment T2, the transmit end sends an MPDU with SN=4 over the link 1, and WinStart=SN<WinEnd is satisfied. Therefore, a corresponding bit at an offset corresponding to the SN (that is, the sequence number is 4) is set to 1, to indicate that the MPDU corresponding to SN=4 is successfully received.

In this case, the receive end still stores SSN_1=0, SSN_2=6, and WinStart=4.

At a moment T3, the transmit end sends a BAR carrying SSN=10 over the link 1. The receive end records a smaller value of SSNs corresponding to the two links as WinStart_x, that is, WinStart_x=min(SSN_1, SSN_2)=min(10, 6)=6. The receive end compares WinStart_x and WinStart_y before receiving the BAR frame (that is, WinStart at a moment T2), and uses a larger value as current WinStart, that is, WinStart=max {WinStart_x, WinStart_y}=max {6, 4}=6.

The receive end stores SSN_1=10, SSN_2=6, and WinStart=6.

At a moment T4, the transmit end sends an MPDU with SN=107 over the link 2, where the MPDU meets that the SN falls outside a current scoreboard window but falls within half of a sequence window space range, that is, WinEnd<SN<WinStart+2^11. The scoreboard shifts rightwards to accommodate the SN, and a starting sequence number of the current scoreboard window is set to WinStart=SN−WinSize+1=107−100+1=8. In this case, SN=107 falls in the adjusted scoreboard window, and a corresponding bit is set to 1.

The receive end stores SSN_1=10, SSN_2=6, and WinStart=8.

Comparatively speaking, if the starting sequence number (WinStart) shift rule of the scoreboard provided in the conventional technology is used in the same scenario, as shown in FIG. 16, at the moment T1, the transmit end sends a BAR frame over the link 2, where SSN carried in the BAR frame is 6, and the receive end adjusts WinStart to SSN corresponding to the BAR, that is, WinStart=SSN_2=6.

At the moment T2, the transmit end sends an MPDU with SN=4 over the link 1. Because SN=4<WinStart, even if the MPDU corresponding to the SN is successfully received by the receive end, the MPDU is discarded or deleted by the receive end.

At a moment T3, the transmit end sends a BAR over the link 1, where the carried SSN is 10; the receive end adjusts WinStart to an SSN corresponding to the BAR, that is, WinStart=SSN_1=10. Correspondingly, WinEnd=109.

At a moment T4, the transmit end sends an MPDU with SN=107 over the link 2, where the MPDU meets that the SN falls within a current scoreboard window, that is, WinStart<SN<WinEnd; and sets a bit corresponding to the MPDU to 1.

It can be understood by comparing the multi-link transmission solution provided in FIG. 18 with the multi-link transmission solution provided in the conventional technology in FIG. 16 that, according to the scoreboard window starting sequence number (WinStart) shift rule provided in this embodiment, the MPDU corresponding to SN=4 is successfully received by the receive end and is not discarded or deleted. In addition, according to the scoreboard window starting sequence number (WinStart) shift rule, when sending a BAR frame, the transmit end does not need to ensure that there is no sequence number of any to-be-transmitted MPDU on another link is smaller than an SSN in the BAR frame and does not need to modify an existing BAR frame. Therefore, when a structure of the original BAR frame is maintained, indication overheads are greatly reduced, and MPDUs on a plurality of links are correctly received.

FIG. 18 is merely an example. A problem shown in FIG. 9 can also be resolved using the scoreboard window starting sequence number (WinStart) shift rule 2. For example, when SSN_2 carried in the BAR sent by the transmit end over the link 2 is 32, MPDUs whose SNs are 1 to 31 in the A-MPDU 1 are sent by the transmit end over the link 1. If corresponding SSN_1=1, the receive end adjusts WinStart to a smaller value, that is, WinStart=min(SSN_1, SSN_2)=min(1, 32)=1. Therefore, when an error MPDU in the A-MPDU 1 is subsequently retransmitted over the link 1, the MPDU is not discarded or deleted by the receive end.

In the embodiment 4, when receiving a BAR frame, the receive end adjusts WinStart based on a smallest value of an SSN carried in the BAR frame and SSNs maintained or stored by the receive end, and WinStart before receiving the BAR frame; when receiving a data frame sent over one link, the receive end may also adjust WinStart based on an SN corresponding to the data frame. In this way, a misoperation on an MPDU to be sent over another link (where an SSN of the MPDU is smaller than the SSN carried in the BAR frame) is avoided.

Embodiment 5

The embodiment 5 describes, by using an example, a multi-link transmission solution in which the scoreboard window starting sequence number (WinStart) shift rule 2 may be applied.

Figure 19:
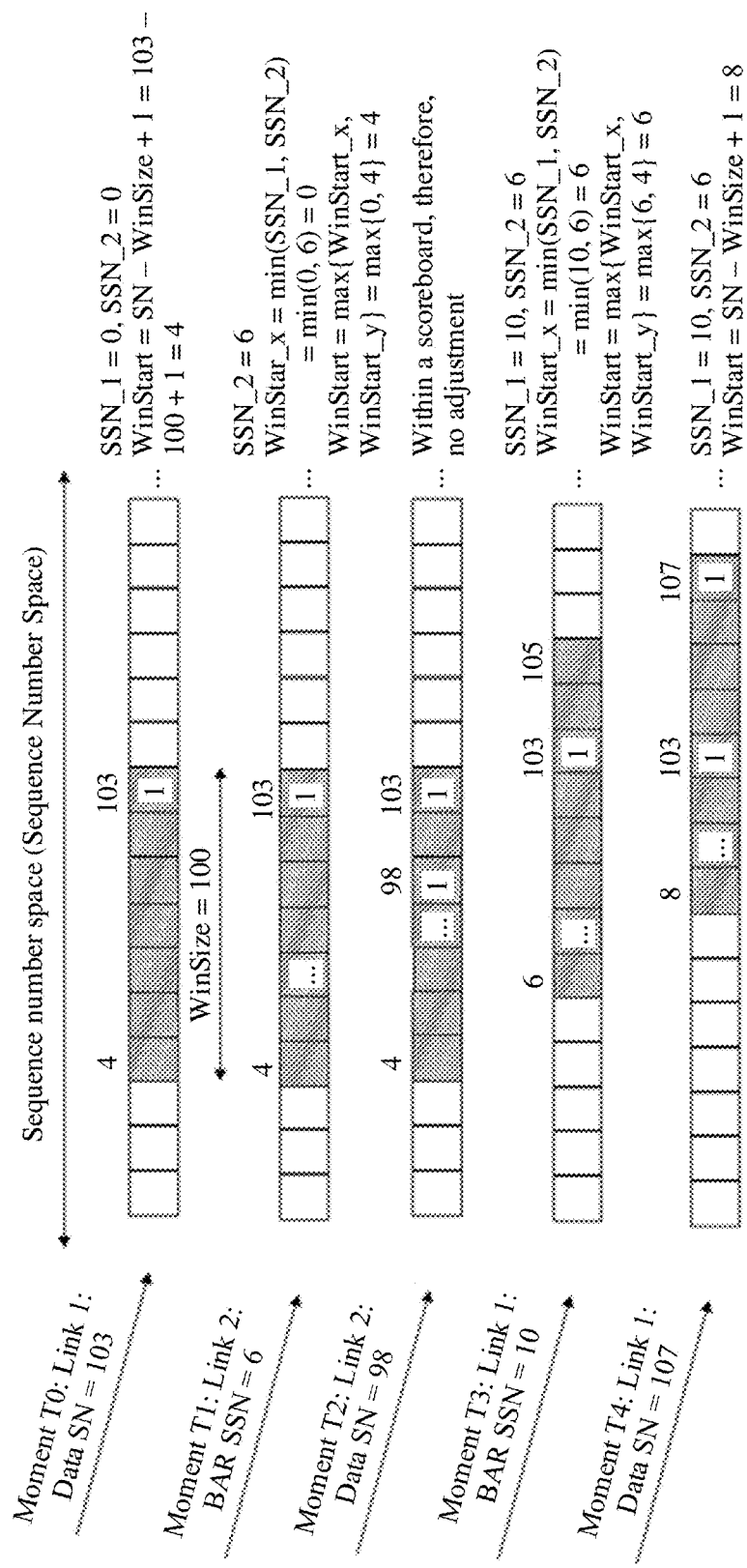
FIG. 19 is another schematic flowchart of multi-link aggregation transmission according to an embodiment.

First, the SSN in the ADDBA request/response frame is set to 0, and both SSN_1 and SSN_2 may be initialized to 0. It is assumed that only the block acknowledgment policy is used on the link 1 and the link 2, and the transmit end has not sent a BAR frame before and has not sent an MPDU whose SN is greater than 99 (shown as Data in FIG. 19).

At a moment T0, the transmit end sends an MPDU whose SN is 103 to the receive end over the link 1. The SN of the data frame falls outside a current scoreboard window but within half of a sequence window space, that is, WinEnd<SN<WinStart+2^11. The scoreboard shifts rightwards to accommodate the SN, sets the starting sequence number of the current scoreboard window to WinStart=SN−WinSize+1=103−100+1=4, and sets a bit corresponding to an offset corresponding to the SN (that is, the sequence number is 103) in the sequence number space to 1, which indicates that the MPDU corresponding to SN=103 is successfully received.

Different from the shift rule 1 applied in the embodiment 3, in the embodiment 5, the shift rule 2 is applied. In this case, SSN_1 and SSN_2 stored in the receive end are not updated, and SSN_1=0 and SSN_2=0, still.

At a moment T1, the transmit end sends a BAR frame carrying SSN=6 over the link 2. The receive end records a smaller value of SSNs corresponding to the two links as WinStart_x, that is, WinStart_x=min(SSN_1, SSN_2)=min (0, 6)=0. The receive end compares WinStart_x and WinStart_y before receiving the BAR frame (that is, WinStart at a moment T0), and uses a larger value as current WinStart, that is, WinStart=max {WinStart_x, WinStart_y}=max {0, 4}=4.

The receive end stores SSN_1=0, SSN_2=6, and WinStart=4.

At a moment T2, the transmit end sends an MPDU with SN=98 over the link 1, and WinStart=SN<WinEnd is satisfied. Therefore, a corresponding bit at an offset corresponding to the SN (that is, the sequence number is 98) is set to 1, to indicate that the MPDU corresponding to SN=98 is successfully received.

In this case, the receive end still stores SSN_1=0, SSN_2=6, and WinStart=4.

At a moment T3, the transmit end sends a BAR carrying SSN=10 over the link 1. The receive end records a smaller value of SSNs corresponding to the two links as WinStart_x, that is, WinStart_x=min(SSN_1, SSN_2)=min(10, 6)=6. The receive end compares WinStart_x and WinStart_y before receiving the BAR frame (that is, WinStart at a moment T2), and uses a larger value as current WinStart, that is, WinStart=max {WinStart_x, WinStart_y}=max {6, 4}=6.

The receive end stores SSN_1=10, SSN_2=6, and WinStart=6.

At a moment T4, the transmit end sends an MPDU with SN=107 over the link 2, where the MPDU meets that the SN falls outside a current scoreboard window but falls within half of a sequence window space range, that is, WinEnd<SN<WinStart+2^11. The scoreboard shifts rightwards to accommodate the SN, and a starting sequence number of the current scoreboard window is set to WinStart=SN−WinSize+1=107−100+1=8. In this case, SN=107 falls in the adjusted scoreboard window, and a corresponding bit is set to 1.

The receive end stores SSN_1=10, SSN_2=6, and WinStart=8.

In the embodiment 5, when receiving a BAR frame, the receive end adjusts WinStart based on a smallest value of an SSN carried in the BAR frame and SSNs maintained or stored by the receive end, and WinStart before receiving the BAR frame; when receiving a data frame sent over one link, the receive end may also adjust WinStart based on an SN corresponding to the data frame. According to the embodiment 5, it can be ensured that data frames sent over a plurality of links are correctly received and are not deleted by mistake, thereby improving data transmission efficiency.

It should be understood that, in the method embodiment shown in FIG. 13 and the embodiment 1 to embodiment 5, in multi-link aggregation, the receive end may receive a plurality of frames at the same time. The frames may be data frames (MPDUs), or BAR frames, or may include both data frames and BAR frames. In this case, the receive end may process the frames one by one in any order.

In conclusion, in the method embodiment shown in FIG. 13 and the embodiment 1 to the embodiment 5, SN bitmap indication information of an MPDU transmitted on a local link does not need to be added to a BAR frame for each link, which reduces signaling overheads. Compared with the conventional technology 2 and the conventional technology 3, setting of an SSN in a BAR frame sent by the transmit end does not need to be limited, and interaction between plurality of links of the transmit end is not required.

Optionally, based on the foregoing embodiment, an embodiment may further provide a BAR sending rule. Interaction between a plurality of links is not required, and an existing BAR frame is not modified. Instead, when a transmit end sends a BAR over a link, an SSN carried in the BAR is set to a sequence number of a MAC protocol data unit (MPDU) to be sent over the link, or is greater than a sequence number of an MPDU that is sent over the link but is deleted or discarded by the receive end.

In short, in this embodiment, a rule for sending a BAR by a transmit end may be as follows:

An SSN carried in a BAR sent over each aggregation link may be set to a sequence number of a next MPDU to be sent over the link or a value greater than a sequence number of a discarded MPDU.

In this way, a BAR is sent to flush the rearrangement buffer, and an unacknowledged sequence represented by an MSDU retransmitted due to timeout is flushed. In this way, a subsequent complete MSDU does not need to be suspended to wait for a sequence to become complete. All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to the embodiments are all or partially generated. The computer may be a general-purpose computer, a dedicated computer, a computer network, or other programmable apparatuses. The computer instructions may be stored in a non-transitory computer-readable storage medium or may be transmitted from a non-transitory computer-readable storage medium to another non-transitory computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state drive (SSD)), or the like.

The objectives, solutions, and beneficial effects of the embodiments are described in detail in the foregoing implementations. Any modification, equivalent replacement, or improvement made without departing from the spirit and principle shall fall within the scope of the embodiments.

What is claimed is:

1. A multi-link aggregation transmission method, applied to a receive end of multi-link aggregation transmission, the method comprising:
receiving, by the receive end, at least one of a data frame and a block acknowledgment request (BAR) frame over a plurality of links between the receive end and a transmit end, wherein the plurality of links comprises a first link;
receiving, by the receive end, the BAR frame over the first link, wherein the BAR frame carries a starting sequence number (SSN) corresponding to the first link (SSN_1);
adjusting, by the receive end based on the SSN_1 corresponding to the first link and an SSN that corresponds to another link and that is stored in the receive end, a value of a current starting sequence number of a scoreboard window (WinStart);
processing, by the receive end based on the adjusted WinStart, the data frame received over the plurality of links;
adjusting, by the receive end, the WinStart to a smallest SSN value, wherein the smallest SSN value is a smallest SSN in the SSN_1 corresponding to the first link and the SSN that corresponds to another link and that is stored in the receive end;
receiving a data frame sent over one specific link, wherein a sequence number SN of the data frame satisfies: a window end sequence number (WinEnd) <SN<WinStart+2^11; adjusting WinStart to WinStart=SN−a window size (WinSize)+1; and
updating an SSN that is in SSNs corresponding to the plurality of links and that is smaller than the adjusted WinStart to be the same as the adjusted WinStart.

2. The multi-link aggregation transmission method according to claim 1, further comprising:
adjusting, by the receive end, the WinStart to a largest WinStart value, wherein the largest WinStart value is largest WinStart in WinStart before the BAR is received and WinStart after the BAR is received, the WinStart after the BAR is received is a smallest SSN value, and the smallest SSN value is a smallest SSN in the SSN_1 corresponding to the first link and the SSN that corresponds to another link and that is stored in the receive end.

3. The multi-link aggregation transmission method according to claim 2, wherein processing, based on the adjusted WinStart, the data frame received over the plurality of links further comprises:
receiving a data frame sent over one specific link, wherein a sequence number SN of the data frame satisfies WinEnd <SN<WinStart+2^11; and adjusting WinStart to WinStart=SN−WinSize+1.

4. The multi-link aggregation transmission method according to claim 1, wherein the SSN_1 is a sequence number of a next data frame to be sent over the first link, or the SSN_1 is greater than a sequence number of a data frame discarded by the transmit end on the first link.

5. A multi-link device, serving as a receive end of multi-link aggregation transmission, comprising:
a transceiver, configured to receive at least one of a data frame and a block acknowledgment request (BAR) frame over a plurality of links between the transceiver and a transmit end, wherein the plurality of links comprises a first link, and
the transceiver is configured to receive the BAR frame over the first link, wherein the BAR frame carries a starting sequence number (SSN) corresponding to the first link (SSN_1); and
a processor, configured to:
adjust, based on the SSN_1 corresponding to the first link and an SSN that corresponds to another link and that is stored in the receive end, a current starting sequence number of a scoreboard window (WinStart);
process, based on the adjusted WinStart, the data frame received over the plurality of links;
adjust, the WinStart to a smallest SSN value, wherein the smallest SSN value is a smallest SSN in the SSN_1 corresponding to the first link and the SSN that corresponds to another link and that is stored in the receive end,
receive a data frame sent over one specific link, wherein a sequence number SN of the data frame satisfies: a window end sequence number (WinEnd) <SN<WinStart+2^11; adjusting WinStart to WinStart=SN−a window size (WinSize)+1; and
update an SSN that is in SSNs corresponding to the plurality of links and that is smaller than the adjusted WinStart to be the same as the adjusted WinStart.

6. The multi-link device according to claim 5, wherein the processor is further configured to:
adjust, the WinStart to a largest WinStart value, wherein the largest WinStart value is largest WinStart in WinStart before the BAR is received and WinStart after the BAR is received, the WinStart after the BAR is received is a smallest SSN value, and the smallest SSN value is a smallest SSN in the SSN_1 corresponding to the first link and the SSN that corresponds to another link and that is stored in the receive end.

7. The multi-link device according to claim 6, wherein the processor is further configured to:
receive a data frame sent over one specific link, wherein a sequence number SN of the data frame satisfies WinEnd <SN<WinStart+2^11; and adjusting WinStart to WinStart=SN−WinSize+1.

8. The multi-link device according to claim 5, wherein the SSN_1 is a sequence number of a next data frame to be sent over the first link, or the SSN_1 is greater than a sequence number of a data frame discarded by the transmit end on the first link.

9. A chip system, comprising:
at least one processor; and
an interface, wherein the interface is configured to:
input at least one of a data frame and a block acknowledgment request (BAR) frame received over a plurality of links between the interface and a transmit end, wherein the plurality of links comprises a first link, and
input the BAR frame received over the first link, wherein the BAR frame carries a starting sequence number (SSN) corresponding to the first link (SSN_1);
the processor is configured to:
adjust, based on the SSN_1 corresponding to the first link and an SSN that corresponds to another link and that is stored in the receive end, a current starting sequence number of a scoreboard window (WinStart),
process, based on the adjusted WinStart, the data frame received over the plurality of links;
a memory configured to store a smallest SSN in the SSN corresponding to another link, and the processor is further configured to:
adjust the WinStart to a smallest SSN value, wherein the smallest SSN value is a smallest SSN in the SSN_1 corresponding to the first link and the SSN that corresponds to another link and that is stored in the memory;
wherein the interface is further configured to input a received a data frame sent over one link, wherein a sequence number SN of the data frame satisfies: a window end sequence number WinEnd) <SN<WinStart+2^11; the processor adjusts the WinStart to WinStart=SN−a window size (WinSize)+1, and the processor is further configured to:
update an SSN that is in SSNs corresponding to the plurality of links and that is smaller than the adjusted WinStart to be the same as the adjusted WinStart.

10. The chip system according to claim 9, wherein the processor is further configured to:
adjust the WinStart to a largest WinStart value, wherein the largest WinStart value is largest WinStart in WinStart before the BAR is received and WinStart after the BAR is received, the WinStart after the BAR is received is the smallest SSN value, and the smallest SSN value is a smallest SSN in the SSN_1 corresponding to the first link and the SSN that corresponds to another link and that is stored in the memory.

11. The chip system according to claim 10, wherein the interface is further configured to input a received a data frame sent over one link, wherein a sequence number SN of the data frame satisfies WinEnd <SN<WinStart+2^11, and the processor is further configured to adjust the WinStart to WinStart=SN−WinSize+1.

12. The chip system according to claim 9, wherein the SSN_1 is a sequence number of a next data frame to be sent over the first link, or the SSN_1 is greater than a sequence number of a data frame discarded by the transmit end on the first link.

* * * * *